(12) United States Patent
Stoeger et al.

(10) Patent No.: US 10,724,764 B2
(45) Date of Patent: *Jul. 28, 2020

(54) DEVICE FOR THE CONCENTRATION OF SOLAR RADIATION

(71) Applicant: HELIOVIS AG, Wiener Neudorf (AT)

(72) Inventors: Elmar Stoeger, Wiener Neudorf (AT); Felix Tiefenbacher, Wiener Neudorf (AT)

(73) Assignee: HELIOVIS AG, Wiener Neudorf (AT)

( * ) Notice: Subject to any disclaimer, the term of this patent is extended or adjusted under 35 U.S.C. 154(b) by 202 days.

This patent is subject to a terminal disclaimer.

(21) Appl. No.: 15/536,923

(22) PCT Filed: Dec. 18, 2015

(86) PCT No.: PCT/EP2015/080384
§ 371 (c)(1),
(2) Date: Jun. 16, 2017

(87) PCT Pub. No.: WO2016/097236
PCT Pub. Date: Jun. 23, 2016

(65) Prior Publication Data
US 2017/0343243 A1    Nov. 30, 2017

(30) Foreign Application Priority Data
Dec. 19, 2014 (EP) .................................. 14199163

(51) Int. Cl.
*F24S 23/74* (2018.01)
*F24S 25/50* (2018.01)
(Continued)

(52) U.S. Cl.
CPC ............ *F24S 23/745* (2018.05); *F24S 20/80* (2018.05); *F24S 25/13* (2018.05); *F24S 25/50* (2018.05);
(Continued)

(58) Field of Classification Search
CPC .. F24J 23/745; F24J 25/13; F24J 25/50; F24J 30/425; F24J 20/80; F24S 2030/14;
(Continued)

(56) References Cited

U.S. PATENT DOCUMENTS

2009/0260620 A1    10/2009  Winger et al.
2010/0229850 A1 *  9/2010   Sankrithi ............ H01L 31/0543
                                                            126/601
(Continued)

FOREIGN PATENT DOCUMENTS

WO      2012145774 A2    11/2012
WO      2014037272 A1    3/2014

OTHER PUBLICATIONS

International Bureau of WIPO, International Preliminary Report on Patentability Issued in Application No. PCT/EP2015/080384, dated Jun. 29, 2017, WIPO, 6 pages.
(Continued)

*Primary Examiner* — Matthew T Martin
(74) *Attorney, Agent, or Firm* — McCoy Russell LLP

(57) ABSTRACT

A device for concentration of solar radiation in an absorber, said device comprising an inflatable concentrator cushion having a cover film element with a light-permeable entry window for coupling in solar radiation and a reflector film for concentration of solar radiation in an absorber, the reflector film sub-dividing the concentrator cushion into at least two hollow spaces and having a curvature in an inflated state. The device also comprises a pivoting apparatus, with which the concentrator cushion is pivotable, a retaining apparatus secured to the pivoting apparatus, and an adjusting device for adjusting the curvature of the reflector film. The retaining apparatus comprises a lower longitudinal member which is connected to a bottom film element of the concentrator cushion. The adjusting device comprises a tensioning element between the lower longitudinal member and the
(Continued)

reflector film, said tensioning element being connected to the reflector film and to the lower longitudinal member.

18 Claims, 23 Drawing Sheets

(51) Int. Cl.
*F24S 30/425* (2018.01)
*F24S 20/80* (2018.01)
*F24S 25/13* (2018.01)
*H02S 20/10* (2014.01)
*H02S 40/42* (2014.01)
*F24S 30/00* (2018.01)

(52) U.S. Cl.
CPC ......... *F24S 30/425* (2018.05); *F24S 2030/14* (2018.05); *H02S 20/10* (2014.12); *H02S 40/42* (2014.12); *Y02E 10/47* (2013.01)

(58) Field of Classification Search
CPC ............. H01L 31/0543; H01L 31/0547; H01L 31/052; H02S 40/425; H02S 20/00
See application file for complete search history.

(56) References Cited

U.S. PATENT DOCUMENTS

2011/0030675 A1   2/2011   King et al.
2014/0168801 A1   6/2014   Xiao

OTHER PUBLICATIONS

ISA European Patent Office, International Search Report Issued in Application No. PCT/EP2015/080384, dated Mar. 7, 2016, WIPO, 6 pages.

* cited by examiner

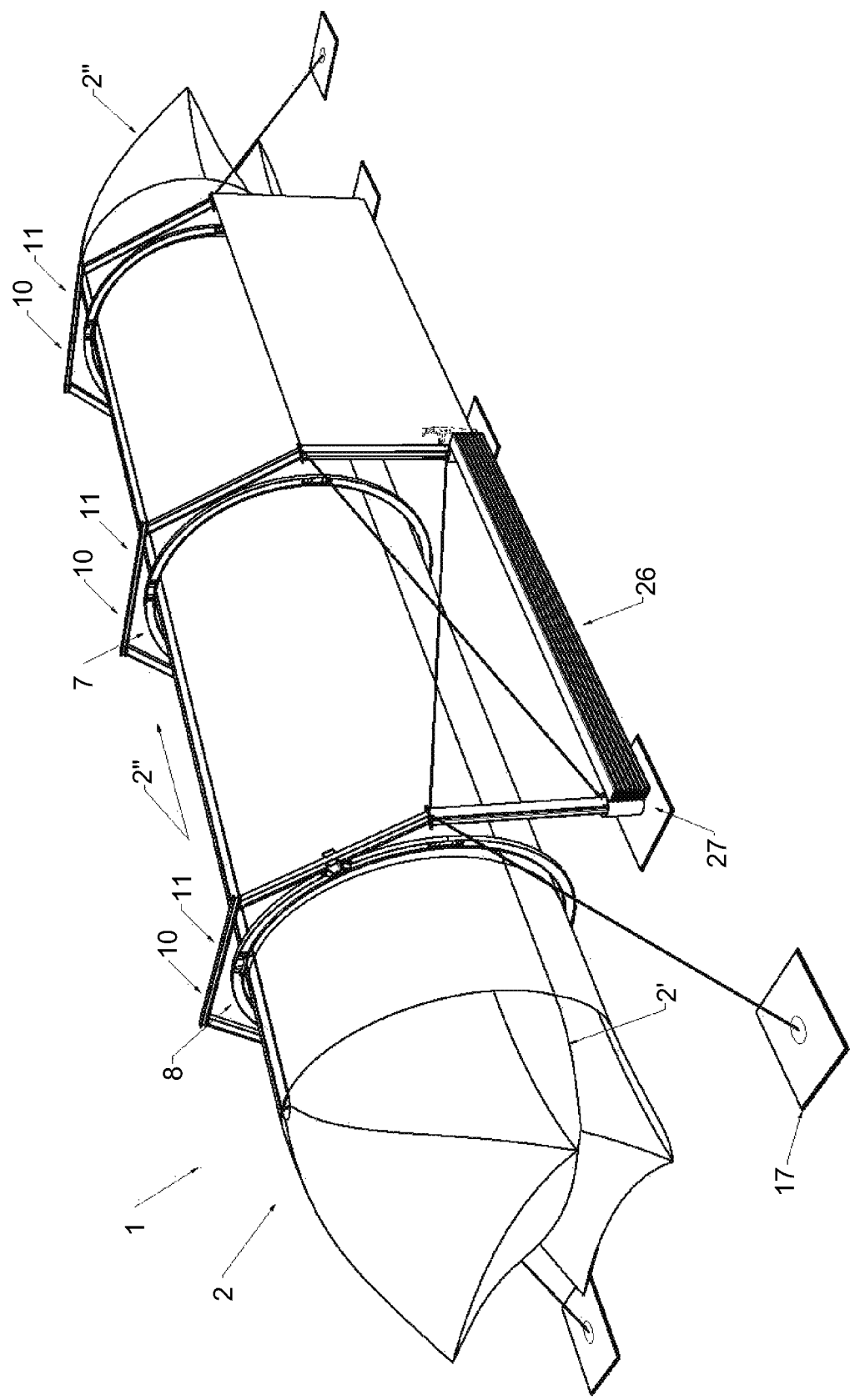

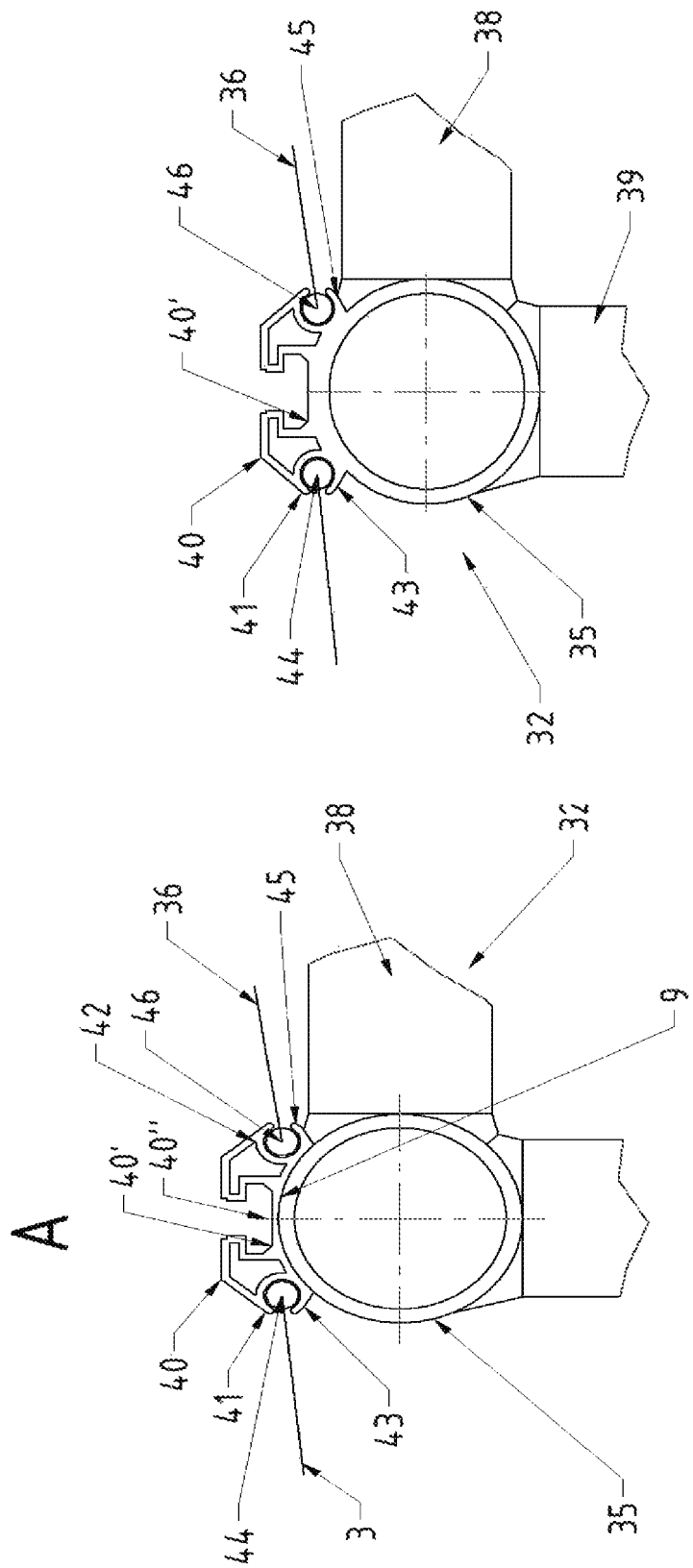

DEVICE FOR THE CONCENTRATION OF SOLAR RADIATION

CROSS-REFERENCE TO RELATED APPLICATIONS

The present application is a U.S. National Phase of International Patent Application Serial No. PCT/EP2015/080384, entitled "DEVICE FOR THE CONCENTRATION OF SOLAR RADIATION," filed on Dec. 18, 2015. International Patent Application Serial No. PCT/EP2015/080384 claims priority to European Patent Application No. 14199163.8, filed on Dec. 19, 2014. The entire contents of each of the above-cited applications are hereby incorporated by reference for all purposes.

TECHNICAL FIELD

The invention relates to a device for the concentration of solar radiation in an absorber, comprising an inflatable concentrator cushion which comprises a cover film element with a light-permeable entry window for coupling in solar radiation and a reflector film for the concentration of solar radiation in an absorber, the reflector film sub-dividing the concentrator cushion into at least two hollow spaces and having a curvature in the inflated state of the concentrator cushion. The device also comprises a pivoting apparatus with which the concentrator cushion can be pivoted, in particular about its longitudinal axis, a retaining apparatus secured to the pivoting apparatus for retaining the concentrator cushion, and an adjusting device for adjusting the curvature of the reflector film of the concentrator cushion.

BACKGROUND AND SUMMARY

A generic device for the concentration of solar radiation in an absorber has become known from WO 2012/145774. The device has an inflatable concentrator which is formed by an elongated, substantially cylindrical tubular sleeve of a plurality of film elements. On the top side, the cushion has a transparent entry window for the solar radiation to pass through. Provision is further made for a reflector film by means of which the cushion is sub-divided into at least two separate pressure chambers. The reflector film has a reflecting surface by means of which the coupled-in solar radiation is focused in the direction of an absorber. For anchoring the concentrator, provision is made for an anchoring frame. The anchoring frame has a tracking system, so that the cushion-shaped concentrator can track the sun's path. The tracking system has a plurality of tracking rings which surround the concentrator cushion and which are rotatably supported by means of rolling devices. The tracking rings are supported on bottom-side base elements. To effect the pivoting of the concentrator, the tracking rings are secured to the longitudinal sides of the concentrator cushion via local, substantially square, retaining plates.

Due to the pressure difference between the two pressure chambers of the concentrator the reflecting surface is curved concavely, so that the incident solar radiation is focused in the absorber. In practice it has turned out that the efficiency of the concentrator is impaired by the fact that the curvature of the reflecting film deviates from the parabolic shape which would enable optimum focusing of the solar radiation.

To mitigate this problem US 2009/0260620 A1 suggested an inflatable solar collector in which the lower hollow space is provided with correction chambers laterally beneath the reflecting film. The pressure relations in the correction chambers were chosen such that the reflecting film is adapted more strongly to the parabolic shape.

This measure, however, has turned out to be insufficient since the pressure differences in the correction chambers have an effect on the geometry of the flexible side walls of the solar collector, which are in turn connected to the reflector film. Thus, the curvature of the reflector film may be modified in an unpredictable manner. Moreover, the pressures in the correction chambers disadvantageously would have to be adjusted very accurately to adapt the curvature of the reflector film by exerting pressure from the underside. Accordingly, the prior art requires a complex control and/or regulation of the pressure relations. Due to the influence of the correction chambers on the flexible film structure of the solar collector the reflector film can be adapted only inaccurately to the parabolic shape even if the pressure relations are adjusted accurately. Moreover, it is a disadvantage in the prior art that at least two correction chambers have to be provided at the longitudinal sides. This aggravates the manufacturing, assembling, and operating of the solar collector.

According to this, it is the object of the invention at hand to eliminate or to ease, respectively, the disadvantages of the prior art. The invention thus in particular has the goal of creating a device of the above-specified type by means of which it is possible to accurately adjust the curvature of the reflector film with constructionally simple means to increase the efficiency of energy conversion.

This object is solved by means of a device for concentration of solar radiation in an absorber, comprising an inflatable concentrator cushion which comprises a cover film element comprising a light-permeable entry window for coupling in solar radiation and a reflector film for the concentration of the solar radiation in an absorber, the reflector film sub-dividing the concentrator cushion into at least two hollow spaces and having a curvature in an inflated state of the concentrator cushion, a pivoting apparatus by means of which the concentrator cushion is pivotable, a retaining apparatus mounted to the pivoting apparatus, for retaining the concentrator cushion, and an adjusting device for adjusting the curvature of the reflector film of the concentrator cushion, wherein the retaining apparatus comprises a lower longitudinal member which extends in a longitudinal direction of the concentrator cushion and which is connected to a bottom film element of the concentrator cushion, wherein the adjusting device for adjusting the curvature of the reflector film comprises a tensioning element between the lower longitudinal member of the retaining apparatus and the reflector film, said tensioning element being connected on one side to the reflector film and on another side to the lower longitudinal member of the retaining apparatus. Embodiments are specified in the dependent claims.

According to the invention, the retaining apparatus comprises a lower longitudinal member which extends in the longitudinal direction of the concentrator cushion and which is connected with a bottom film element of the concentrator cushion, wherein the adjusting device for adjusting the curvature of the reflector film comprises a tensioning element between the lower longitudinal member of the retaining apparatus and the reflector film, wherein the tensioning element is connected on the one side with the reflector film and on the other side with the lower longitudinal member of the retaining apparatus.

Accordingly, the elongated concentrator cushion which has preferably a substantially cylindrical cross-section is secured at the lower side to the lower longitudinal member of the retaining apparatus. For the purpose of the instant disclosure the terms "top or upper" and "bottom or lower" always refer to the operating position of the device, wherein the bottom film element of the concentrator cushion faces an underground and/or a soil structure at the site of use. In the operating state the lower side of the concentrator cushion is fixed in the region of the bottom film element to the lower longitudinal member which is manufactured of a substantially rigid material, i.e. a material substantially non-resilient to operating forces, especially metal. This makes it possible to achieve a stable support of the concentrator cushion. The pressure difference between the upper hollow space and the lower hollow space of the concentrator cushion causes in the inflated operating state a substantially two-dimensional curvature of the reflector film which remains constant in the longitudinal direction of the concentrator cushion and by means of which a focusing of the incident solar radiation in the absorber inside the upper hollow space is accomplished. For achieving a high efficiency of the concentrator cushion it is essential that the solar radiation is focused accurately in the region of the absorber. The deflection of the reflector film due to the pressure difference between the upper and the lower hollow spaces of the concentrator cushion would, without further measures, deviate from the parabolic shape which would promise the maximum energy yield. For approaching the curvature of the reflector film to the parabolic shape, provision is made in accordance with the invention for a tensioning element which is connected on the one side with the reflector film and on the other side with the lower longitudinal member of the retaining apparatus. In the tensioned state of the tensioning element in operation of the concentrator an additional tensile force is transferred to the reflector film by means of the tensioning element, which causes a slight stretching of reflecting sections of the reflector film. This makes it possible to reduce the deviation of the reflecting surface from the ideal parabolic shape. Advantageously, the energy yield of the concentrator cushion may be increased distinctly by this simple measure. The arrangement of the tensioning element in accordance with the invention enables a much more accurate adaptation of the cross-sectional geometry of the reflector film than the prior art of US 2009/0260620 A1 in which additional pressure chambers were arranged directly beneath the reflector film. Contrary to this, the tensioning element according to the invention causes a kink or constriction of the reflector film in the region of the connection between the tensioning element and the reflector film. The tensioning element thus achieves a deviation from the continuous cross-section course of the reflector film which results from the pressure difference between the upper hollow space and the lower hollow space of the concentrator cushion. On both sides of the contact area of the tensioning element at the reflector film two reflecting sections are formed by means of which the incident solar radiation is reflected in the absorber. Advantageously, the tensile force transferred by the tensioning element to the reflector film can be adjusted substantially more accurately and easily than the slight pressure differences in the correction chambers of prior art by means of which likewise a certain adaptation of the curvature of the reflector film should have been effected. In accordance with the invention the adjustment of the reflector film is additionally facilitated in that the tensioning element is secured to the lower longitudinal member of the retaining apparatus, which is, in the inflated state of the concentrator cushion, arranged to be substantially rigid or immobile. Contrary to this, the correction chambers in prior art may cause certain deformations on the resilient side walls of the known solar collector, which have in turn a disadvantageous effect on the shape of the reflector film. In accordance with the invention these disadvantages are avoided in that the tensioning element is secured to the substantially rigid lower longitudinal member of the retaining apparatus. Thus, the tensile force of the tensioning element may be converted substantially completely to a deformation of the reflector film. Due to the resilience and/or inherent elasticity of the reflector film the reflector film is, in the region of the contact area of the tensioning element, pulled slightly downward, in the direction of the lower longitudinal member, so that the curvature or indentation of the reflecting surface in cross-section is approached to the desired parabolic shape.

To divide the reflecting surface of the reflector film into two reflecting sections of substantially identical design it is beneficial if the tensioning element is connected with a middle longitudinal section of the reflector film, which extends substantially centrally between the longitudinal edges of the reflector film in the longitudinal direction of the concentrator cushion. In this embodiment the tensioning element is adapted to transfer a tensile force to the middle longitudinal section of the reflector film, which extends, in the inflated state of the concentrator cushion, substantially in the middle between the longitudinal edges of the reflector film which extend in parallel to the longitudinal direction of the concentrator cushion. The tensioning element divides the reflecting surface into two reflecting sections extending in the longitudinal direction of the concentrator cushion, which extend, starting out from the contact area of the tensioning element at the middle longitudinal section of the reflector film, to the two longitudinal edges of the reflector film. Due to the curvature of the reflector film in the inflated state of the concentrator cushion the middle longitudinal section of the reflector film has the shortest distance to the lower longitudinal member of the retaining apparatus to which the tensioning element is secured. Due to the tensile force on the middle longitudinal section of the reflector film the two reflecting sections are slightly stretched, wherein the two reflecting sections are separated from each other by a discontinuity, i.e. a kink or an indentation, of the reflector film. Thus, it is possible to adapt the cross-section of the reflector film more strongly to a parabolic shape. Advantageously, the energy yield of the concentrator may thus be further increased.

To focus the solar radiation accurately on the absorber extending in the longitudinal direction of the concentrator cushion it is beneficial if the tensioning element is, over substantially the entire length of the reflector film, connected with the reflector film and the lower longitudinal member. Accordingly the contact area of the tensioning element at the reflector film in the longitudinal direction of the concentrator cushion extends substantially over the entire length of the reflector film. Thus, the cross-sectional geometry of the reflector film in the longitudinal direction of the concentrator cushion may be kept substantially constant to achieve a constant focusing of the solar radiation along the absorber.

For designing the concentrator cushion as a film compound it is beneficial if the tensioning element comprises a tensioning film element which, in the inflated state of the concentrator cushion, is tensioned between the lower longitudinal member and the reflector film. In this embodiment the concentrator cushion is formed by a film structure comprising at least the cover film element, the bottom film element, possibly additionally two side wall film elements, and the tensioning film element. In the uninflated state the film structure of the concentrator cushion is adapted to be arranged in a flat, layered position. Thus it is possible to store the concentrator cushion in a space-saving manner. Moreover, transportation to the site of use is facilitated. It is in particular of advantage that the film structure of the concentrator cushion, including the tensioning film element for adjusting the curvature of the reflector film, may be rolled upon a roll in the uninflated state for preparation of transportation. The film elements of the concentrator cushion, i.e. especially the cover film element, the bottom film element, or the tensioning film element, are preferably manufactured of resilient, thin-walled plastic materials.

For transferring a tensile force to the middle longitudinal section of the reflector film it is of advantage if the tensioning film element comprises a tensioning section contacting the middle longitudinal section of the reflector film substantially rectangularly. Accordingly, the tensioning section of the tensioning film element is, in the inflated operating state of the concentrator cushion, arranged substantially perpendicular to the reflector film in the region of the contact area of the tensioning element, wherein the tensioning section of the tensioning film element is flat or plane, respectively. In this embodiment the cross-sectional area of the tensioning film element in the region of the tensioning section corresponds substantially to the wall strength of the film piece with which the tensioning section is formed. This embodiment advantageously has the effect that the tensile force is transferred merely locally at the contact area of the tensioning section. This may ensure that the reflector film is tensioned evenly on both sides of the contact area of the tensioning element at the reflector film. The tensioning section of the tensioning film element is connected with the reflector film in a suitable manner. The tensioning section may, for instance, transit into a securing section of the tensioning film element which is connected with the reflector film by means of a join connection, for instance, a seam.

In accordance with a particularly preferred embodiment the tensioning film element comprises an inflatable hollow chamber for adjusting the distance between the lower longitudinal member and the reflector film by inflating the hollow chamber of the tensioning film element. In this embodiment it is possible to accurately adjust and readjust the curvature of the reflector film in a particularly simple manner. For this purpose, the tensioning film element comprises an inflatable hollow chamber, i.e. a hollow chamber adapted to be filled with air. Due to the resilience of the tensioning film element it is possible to adapt the shape of the tensioning film element by filling the hollow chamber. By inflating the hollow chamber, i.e. by filling it with air, the tensioning film element may be transferred from a stretched state to a shortened state so as to shorten the height of the tensioning film element, i.e. the distance between the lower contact area of the tensioning film element at the lower longitudinal member of the retaining apparatus and the upper contact area of the tensioning film element at the reflector film. Depending on the filling pressure of the hollow chamber of the tensioning film element the tensile force on the reflector film may be increased or decreased for adjusting or readjusting the bending of the reflector film. Accordingly, in the inflated state of the hollow chamber of the tensioning film element a higher tensile force may be exerted on the reflector film than in the uninflated state of the hollow chamber. This embodiment comprises a number of advantages. Firstly, the curvature of the reflector film may be varied smooth as well as continuously via the filling pressure of the hollow chamber. Secondly, an adaptation of the tension of the reflector film may be performed during the running operation of the concentrator. For this purpose it is beneficial if the hollow chamber of the tensioning film element is connected with an air supply device by which the filling pressure of the hollow chamber and hence the cross-sectional geometry of the tensioning film element is adjustable in the inflated operating state of the concentrator cushion. Preferably, the air supply device is connected with an air pressure sensor by which the filling pressure of the hollow chamber of the tensioning film element can be measured. Advantageously, variations in the geometry of the reflector film may be taken into account in this embodiment during the running operation of the device. In practice, various factors influencing the curvature of the reflector film have to be taken into account. These include especially the ambient temperature at the site of use of the concentrator, the long-term behavior of the plastic materials of the concentrator cushion, or pressure losses in the hollow spaces of the concentrator cushion and/or in the hollow chamber of the tensioning film element. The embodiment of the tensioning film element with the hollow chamber entails, thirdly, the advantage that the device for adjusting the curvature of the reflector film is integrated in the film structure of the concentrator cushion. This makes it possible to renounce rigid adjusting means which would aggravate or prevent the folding or rolling of the concentrator cushion in the uninflated state. Moreover it is, fourthly, beneficial that the volume changes of the hollow chamber of the tensioning film element are, as compared to the distance changes between the reflector film and the lower longitudinal member, comparatively large. This makes it possible to adjust the reflector film accurately even if the air pressure inside the hollow chamber of the tensioning film element can be adjusted with limited accuracy only and this is, moreover, subject to certain fluctuations.

For dissipating the loads acting on the concentrator cushion in operation, such as wind loads, it is beneficial if the lower longitudinal member is connected in a substantially air-tight manner with the longitudinal edges of the bottom film element of the concentrator cushion, which confine a lower passage opening of the concentrator cushion. In this embodiment the bottom film element therefore comprises a lower passage opening for passage of the lower longitudinal member of the retaining apparatus. The longitudinal edges of the bottom film element adjacent to the lower passage opening are connected in a substantially air-tight manner with the longitudinal sides of the lower longitudinal support, so that undesired escape of air from the lower hollow space of the concentrator cushion is prevented substantially completely.

In accordance with a particularly preferred embodiment the lower longitudinal member comprises longitudinal belts, which are connected to one another via filling bars, for a substantially air-tight connection with the longitudinal edges of the bottom film element which confine the lower passage opening, wherein provision is made between the longitudinal belts for a sealing film strip which bridges the lower passage opening of the concentrator cushion. Accordingly, the retaining apparatus passes through a lower passage opening at the lower side of the concentrator cushion, said lower passage opening being sealed on all sides. The lower longitudinal member comprises in this embodiment at least two elongated longitudinal belts which, based on the circumferential direction of the concentrator cushion, are arranged at a distance to one another. Provision is made between the longitudinal belts for a sealing film strip which bridges the lower passage opening of the concentrator cushion. For forming the longitudinal belts, rod elements are preferably provided, which have in particular a substantially circular cross-section. By the arrangement of the sealing film strip the passage opening between the longitudinal belts of the longitudinal member is closed substantially in an air-tight manner, so that the connection between the longitudinal belts of the longitudinal member itself need not be designed to be air-tight.

For increasing the stability of the lower longitudinal member it is of advantage if the lower longitudinal member comprises at least two further longitudinal belts which extend in parallel to the longitudinal belts in the longitudinal direction of the concentrator cushion. Preferably, the longitudinal members have a substantially rectangular, especially substantially square, cross-section, wherein the upper corners are formed by the longitudinal belts and the lower corners by the further longitudinal belts. For achieving a maximum volume of the concentrator cushion inside the pivoting apparatus it is of advantage if the further longitudinal belts of the lower longitudinal member are arranged inside the lower hollow space of the concentrator cushion. In this embodiment the longitudinal belts of the lower longitudinal member extend substantially in the plane of the bottom film element, wherein the further longitudinal belts of the lower longitudinal member are arranged in the lower hollow space of the concentrator cushion. Advantageously, the mounting volume available inside the pivoting apparatus may thus be utilized optimally.

Preferably, the longitudinal belts and/or the further longitudinal belts of the upper longitudinal member are connected to one another via filling bars, wherein preferably further filling bars are provided between the longitudinal belts and the further longitudinal belts. Thus, the longitudinal members are designed as trussed beams.

To connect the concentrator cushion to the lower longitudinal member, it is preferably provided that, at the longitudinal belts of the lower longitudinal member, a profile element in each case is arranged, which is connected to a connecting element for the substantially air-tight connection to one of the longitudinal edges of the bottom film element and to a further connecting element for the substantially air-tight connection to one of the longitudinal edges of the sealing film strip.

To make the connections between the lower longitudinal member and the concentrator cushion substantially air-tight, various sealants may be provided.

To seal the connection between the lower longitudinal member and the concentrator cushion it is beneficial if a keder rail is provided as connecting element, in which a keder element is arranged at the longitudinal edges of the bottom film element. In this embodiment a keder device is therefore provided as a sealant between the concentrator cushion and the lower longitudinal member, said keder device being formed by the keder elements and the corresponding keder rails. The keder elements extend over the length of the longitudinal edges of the bottom film element. At the longitudinal belts of the lower longitudinal member appropriate keder rails are provided which extend in the longitudinal direction of the lower longitudinal member and thus in parallel to the longitudinal edges of the bottom film element. The keder element has a larger cross-section than the bottom film element, wherein the keder element is preferably designed with a round, especially circular, cross-section. Due to the pressure in the lower hollow space of the concentrator cushion the bottom film element is available in a tensioned state, so that the keder elements are pressed against the inner walls of the keder rails at the longitudinal edges of the bottom film element. Thus, a substantially air-tight connection of the concentrator cushion with the lower longitudinal member is achieved, which has turned out to be particularly reliable.

To connect the sealing film strip correspondingly in a substantially air-tight manner with the longitudinal belts of the lower longitudinal member it is favorable if, as a further connecting element, a further keder rail is provided in which a further keder element is arranged at one of the longitudinal edges of the sealing film strip. In this embodiment keder rails are provided at the opposing longitudinal edges of each profile element, which keder rails are preferably of substantially identical design. Accordingly each profile element is connected outwardly to one of the longitudinal edges of the bottom film element and inwardly to one of the longitudinal edges of the sealing film strip.

According to an alternative embodiment of the sealants between the concentrator cushion and the lower longitudinal member, a clamping part is provided as connecting element for clamping one of the longitudinal edges of the bottom film element and/or a further clamping part as further connecting element for clamping one of the longitudinal edges of the sealing film strip. In the case of this embodiment, the longitudinal edges of the bottom film element adjacent to the lower passage opening for the upper longitudinal member are clamped between seats of the clamping part or of the profile element, respectively. By means of the clamping, the bottom film element is connected to the lower longitudinal member in a substantially air-tight manner. The sealing film strip between the longitudinal belts of the lower longitudinal member can correspondingly be clamped to the longitudinal belts of the lower longitudinal member in a substantially air-tight manner by means of further clamping parts.

In accordance with a further embodiment a provision is made for a zipper element as connecting element for the connection to a corresponding zipper element on one of the longitudinal edges of the bottom film element and/or for a further zipper element as further connecting element for the connection to a corresponding further zipper element of the sealing film strip.

For forming the hollow chamber of the tensioning film element provision is made in accordance with a preferred embodiment that the profile elements at the longitudinal belts of the lower longitudinal member are each connected to a securing element for the substantially air-tight connection with a film strip confining the hollow chamber of the tensioning film element. In this embodiment, at the longitudinal belts of the lower longitudinal member not only the connecting elements for the bottom film element and the sealing film strip are provided, but additionally the securing elements for two film strips of the tensioning film element which confine the hollow chamber of the tensioning film element by which the curvature of the reflector film is adjusted. Accordingly, the hollow chamber of the tensioning film element is, in this embodiment, confined by the two film strips of the tensioning film element and the sealing film strip between the longitudinal belts of the lower longitudinal member. To prevent air from escaping from the hollow chamber of the tensioning film element into the lower hollow space of the concentrator cushion substantially completely, the film strips of the tensioning film element inside the lower hollow space of the concentrator cushion are connected in a substantially air-tight manner to the securing elements at the longitudinal belts of the lower longitudinal member. The securing elements for the film strips of the tensioning film element may be of substantially identical design as the connecting elements for the bottom film element or the sealing film strip, respectively. As securing elements preferably keder rails extending in the longitudinal direction of the lower longitudinal member are provided, in which corresponding keder elements are arranged at the lower longitudinal edges of the film strips of the tensioning film element.

In accordance with an alternative preferred embodiment the lower longitudinal member comprises, substantially in the middle between the longitudinal belts, an upper-side securing element for securing the tensioning film element. In this embodiment the securing element for the tensioning film element extends in the longitudinal direction of the concentrator cushion substantially at equal distances to the longitudinal belts of the lower longitudinal member. For the upper-side securing to the lower longitudinal member the tensioning film element comprises preferably a securing section which is flat or plane in the inflated state of the concentrator cushion. This shall mean that the cross-sectional area of the tensioning film element in the region of the securing section corresponds substantially to the wall thickness of the securing section. In this embodiment it is favorable if the tensioning film element is connected with the securing element in a substantially air-tight manner by means of the securing section. For this purpose the upper-side securing element for the tensioning film element may be of substantially identical design as the connecting elements for the bottom film element and/or the sealing film strip. Accordingly, especially a keder rail extending in the longitudinal direction of the lower longitudinal member, in which a corresponding keder element is arranged at the lower longitudinal edge of the tensioning film element, may be provided as upper-side securing element.

In accordance with a particularly preferred embodiment the retaining apparatus comprises an upper longitudinal member extending in the longitudinal direction of the concentrator cushion, wherein the upper longitudinal member is connected in a substantially air-tight manner to the longitudinal edges of the cover film element of the concentrator cushion which confine an upper passage opening of the concentrator cushion. In this embodiment the elongated concentrator cushion which preferably has a substantially cylindrical cross-section is secured at the top side to the upper longitudinal member and at the bottom side to the lower longitudinal member. The upper longitudinal member is adapted for suspension of the absorber which is, in the inflated operating state, arranged inside the upper hollow space of the concentrator cushion. The lower longitudinal member is, as described before, adapted for supporting the concentrator cushion at the lower side, on the one hand, and for securing the tensioning element by which the curvature of the reflector foil may be adjusted, on the other hand. Preferably, the concentrator cushion is arranged exclusively at the upper and the lower longitudinal members. Extensive tests revealed that it is particularly advantageous if the two bearing positions for the concentrator cushion, i.e. the upper and the lower longitudinal members, are arranged away from the reflector film or reflective film, respectively, as far away as possible from a geometric aspect. According to the invention, the concentrator cushion is thus fixed on its top side and on its bottom side. In contrast, it is advantageous if the longitudinal sides of the concentrator cushion, in particular in the area of the longitudinal edges of the reflector film, are arranged so as to be capable of being expanded in the radial direction. A thermal expansion of the concentrator cushion can thus be released in particular in the area of the reflector film, whereby the concave geometry of the reflector film is accurately adhered to for the focusing of the solar radiation in the absorber. By means of the connection of the concentrator cushion to the longitudinal members on the top and bottom sides, the shape of the concentrator cushion can also be maintained reliably in response to large external loads and regardless of the pivoting angle of the concentrator cushion. In this embodiment, in particular the local retaining plates between the pivoting apparatus and the concentrator, which are provided in the prior art, can be renounced. On the one hand, the design distinguishes itself in that wind loads can be transferred efficiently via the longitudinal members. On the other hand, it is advantageous that the pivoting of the concentrator cushion does not have a significant effect on the curvature of the reflector film between the upper and lower hollow spaces of the concentrator cushion due to the retainer on the longitudinal members.

The upper longitudinal member is preferably designed like the lower longitudinal member. The afore-described embodiment variants of the lower longitudinal member and its securing to the lower passage opening may therefore be implemented correspondingly with the upper longitudinal member at the upper passage opening of the concentrator cushion. Accordingly, the longitudinal belts of the upper longitudinal member, on the one hand, may be connected in a substantially air-tight manner with the longitudinal edges of the cover film element which are adjacent to the upper passage opening. On the other hand, the longitudinal belts of the upper longitudinal member may be connected in a substantially air-tight manner with the lateral edge regions of an upper sealing film strip which extends between the longitudinal belts of the upper longitudinal member preferably substantially across the entire width of the upper passage opening.

To make it possible for the concentrator cushion to track the sun's path, i.e. the current position of the sun above the location, it is beneficial if the pivoting apparatus comprises at least one pivoting element, in particular a pivoting ring, which surrounds the concentrator cushion in its circumferential direction, to the inner side of which pivoting element the lower longitudinal member, preferably also the upper longitudinal member, of the retaining apparatus are secured. Preferably, at the inner side of the pivoting element which faces the concentrator cushion, the bottom longitudinal member to which the tensioning element for the reflector foil is secured, is mounted, on the one hand, and the upper longitudinal member on which the absorber for the solar radiation is suspended, is mounted, on the other hand. Such pivoting rings are known per se in the prior art, see, e.g., WO 2012/145774. In contrast to this, the pivoting movement of the pivoting element in the case of the embodiment at hand is transferred to the concentrator cushion via the upper longitudinal member on the top side of the concentrator cushion, on the one hand, and via the lower longitudinal member on the bottom side of the concentrator cushion, on the other hand. The geometry of the reflector film can be reliably ensured in this way, regardless of the pivoting angle of the concentrator cushion. Preferably, no further connections are provided between the pivoting apparatus and the concentrator cushion. According to this, the connections between the upper or lower longitudinal member, respectively, which connections extend in the longitudinal direction, and the concentrator cushion are preferably the only connections between the pivoting apparatus and the retaining apparatus for the concentrator cushion.

To transfer loads, for example wind loads, acting on the concentrator cushion, it is favorable if provision is made for a plurality of pivoting elements, in particular pivoting rings, which are spaced apart in the longitudinal direction of the concentrator cushion and to the inner side of which pivoting elements the upper longitudinal member and the lower longitudinal member of the retaining apparatus are secured. According to this, the longitudinal members are secured to the pivoting elements at defined intervals, wherein the concentrator cushion passes through the individual pivoting elements.

To ensure the geometry of the concentrator cushion and the arrangement of the absorber in the focus area of the reflector film even in the case of high exterior loads, it is favorable if the upper longitudinal member and/or the lower longitudinal member extends at least over more than half of the length of the concentrator cushion, wherein the upper longitudinal member and/or the lower longitudinal member preferably extends between a front end piece and a rear end piece on the front sides of the concentrator cushion. It is thus particularly favorable if the upper longitudinal member and the lower longitudinal member extend substantially over the entire length of the concentrator cushion. In the case of this embodiment, the longitudinal members end adjacent to the end pieces of the concentrator cushion, by means of which the upper and the lower hollow spaces of the concentrator cushion are closed in a substantially air-tight manner. The passage openings of the concentrator cushion extend according to the longitudinal members in longitudinal direction of the concentrator cushion.

To anchor the pivoting apparatus on a bottom structure, provision can be made for an anchoring apparatus which preferably comprises a suspension apparatus for suspending the pivoting apparatus. The pivoting apparatus is set up to pivot the concentrator cushion, preferably about its longitudinal axis. In this embodiment the pivoting apparatus, to which the concentrator cushion is secured in the operating state, is preferably supported substantially completely by the suspension apparatus. For the purposes of this disclosure, the suspension of the pivoting apparatus means that the securing locations between the suspension apparatus and the pivoting apparatus are arranged exclusively above a plane which comprises the center of mass of the pivoting apparatus. The terms "top" and "bottom" here refer to the operating position of the device. This embodiment in particular has the advantage that the external loads, such as wind forces, can be absorbed particularly efficiently and can be transferred to a foundation at the location. It is advantageous in particular that the cushion-shaped or tubular concentrator, respectively, can be kept largely free from external influences. The concave curvature of the reflector film between the upper and the lower hollow spaces of the concentrator can thus be accurately maintained, so that the solar radiation is focused on the absorber with a high efficiency. This design is further advantageous to the effect that the pivoting apparatus can be embodied so as to be slimmer than in the prior art. Material costs can thus be saved. The level of clouding of the reflector film is furthermore reduced, whereby the efficiency can be further increased.

For suspending the pivoting apparatus for the concentrator cushion it is favorable if the suspension apparatus comprises at least one support frame, preferably a plurality of support frames, which are arranged so as to be spaced apart in the longitudinal direction of the concentrator cushion, wherein the at least one support frame in each case comprises at least a first frame element on the one longitudinal side of the concentrator cushion and a second frame element on the other longitudinal side of the concentrator cushion. Advantageously, the support frame can be produced in a simple manner from standard profiles, which already leads to significant cost advantages in the case of small quantities.

To increase the stability of the suspension apparatus, it is advantageous if the support frame comprises a third frame element above the concentrator cushion, which connects the first frame element on the one longitudinal side of the concentrator cushion to the second frame element on the other longitudinal side of the concentrator cushion. In the case of this embodiment, the support frame thus extends from the one longitudinal side of the concentrator cushion beyond the top side of the concentrator cushion to the other longitudinal side of the concentrator cushion, so that the concentrator cushion is arranged completely inside the support frame in the assembled operating state. The pivoting apparatus is preferably suspended on the bottom side of the support frame. According to this, the pivoting apparatus is preferably framed substantially completely by the support frame. This embodiment has turned out to be particularly favorable for absorbing the forces, for example wind forces, which appear during operation.

For the concentrator cushion to track the sun's path, it is advantageous if provision is made between the suspension apparatus and the pivoting apparatus for a pivot bearing apparatus, in particular a roller bearing. Such roller bearings are known per se in the prior art, see, e.g., WO 2012/145774. The roller bearing has roller elements which are in particular provided on a traveling crane. The roller elements are connected to a drive, wherein, in the driven state, the roller elements generate a torque, which effects a pivoting of the pivoting apparatus with the concentrator cushion about an axis, in particular about the longitudinal axis of the concentrator cushion, as a result of a frictional connection in response to the rolling on the pivoting apparatus.

The invention will be explained in more detail below by means of exemplary embodiments, which are illustrated in the drawing, but to which the invention is not to be limited.

BRIEF DESCRIPTION OF THE FIGURES

FIG. 1C shows a further figurative view of the device according to the invention according to FIG. 1B, wherein the concentrator cushion can be seen in the operating state, including the end pieces thereof;

FIG. 6A shows the detail A which is illustrated in FIG. 5 by means of a circle;

FIG. 6B shows a detailed view, which corresponds to FIG. 6A, comprising an alternative embodiment of the upper longitudinal member;

FIGS. 13A, 13B show schematic cross-sectional views of a further embodiment in accordance with the invention of the device, in which an adjusting device is provided for adjusting the curvature of the reflector film, which comprises a tensioning film element with a hollow chamber between the lower longitudinal member of the retaining apparatus and the reflector film, wherein FIG. 13A illustrates the uninflated state and FIG. 13B illustrates the inflated state of the tensioning film element;

DETAILED DESCRIPTION

Figure 1A:
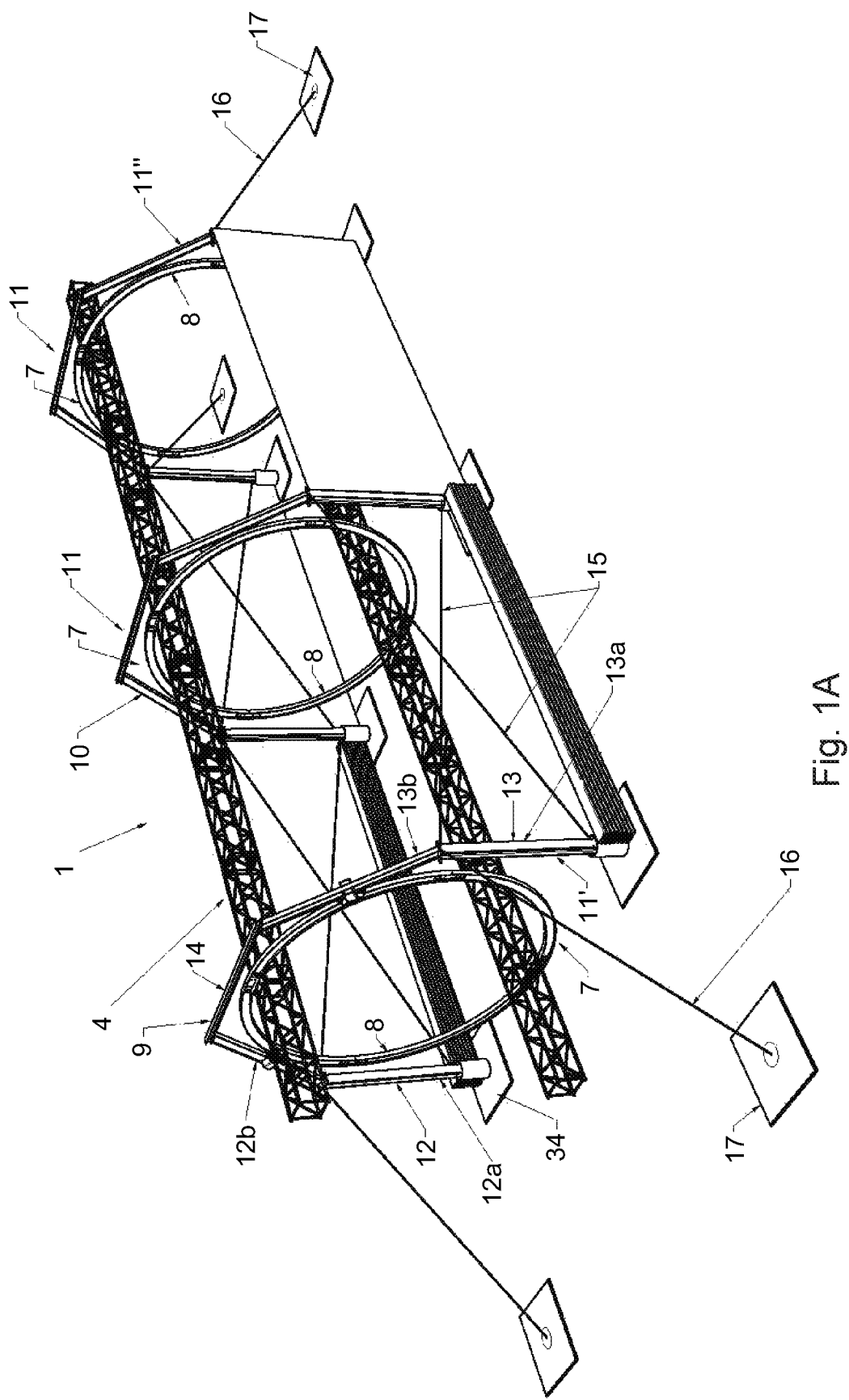
FIG. 1A shows a figurative view of a device according to the invention for the concentration of solar radiation in an absorber (see FIG. 2), in the case of which a plurality of pivoting rings for pivoting a concentrator cushion (see FIGS. 1B, 1C and FIG. 2) are suspended on a support frame.
Figure 1B:
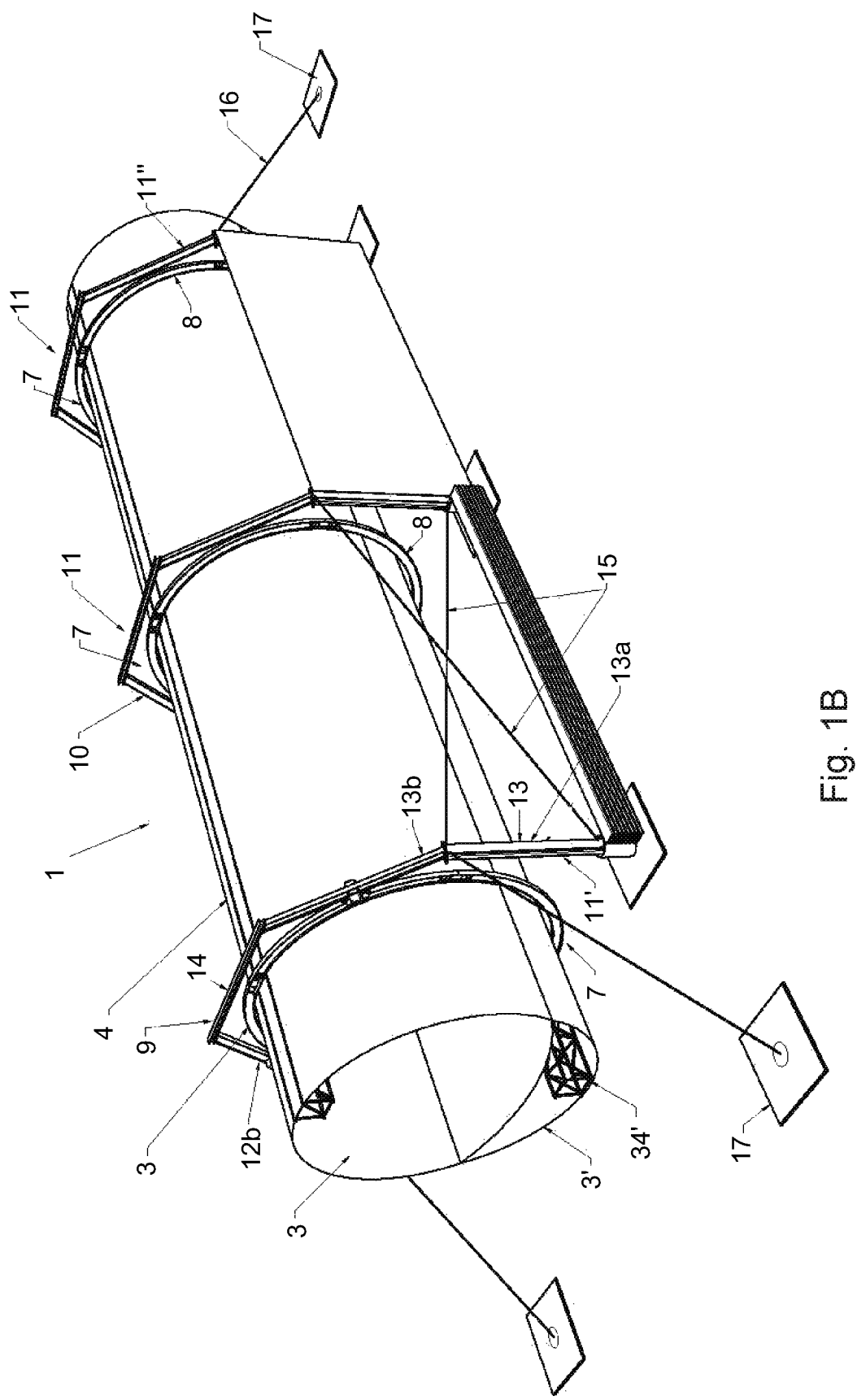
FIG. 1B shows a further figurative view of the device according to the invention according to FIG. 1A, wherein the concentrator cushion (without the end pieces thereof) can additionally be seen.
Figure 2:
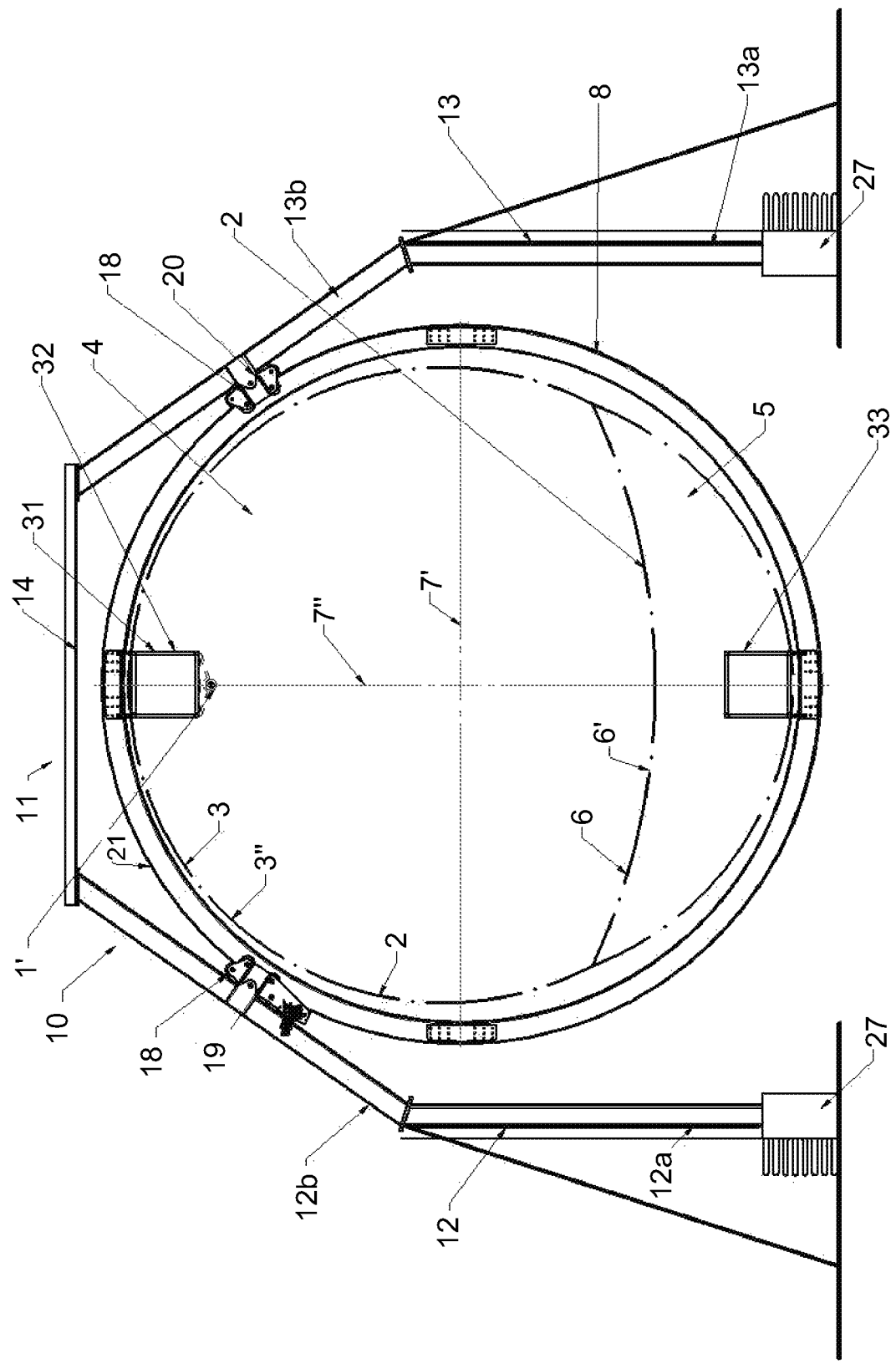
FIG. 2 shows a cross-sectional view of the device according to FIGS. 1A, 1B, and 1C, wherein the concentrator cushion can be seen in the assembled state.

FIGS. 1A, 1B, and 1C shows a device 1 for the concentration of solar radiation in an absorber 1' (see FIG. 2). The device 1 has an inflatable concentrator cushion 2 (see FIGS. 1B, 1C and FIG. 2). The concentrator cushion 2 has a cover film element 3" comprising a light-permeable entry window 3 for coupling in solar radiation and a reflector film 6, which is curved in the operating state and which sub-divides the concentrator cushion 2 into at least two hollow spaces 4, 5, for the concentration of solar radiation in an absorber 1'. The reflector film 6 has a reflecting surface 6', which focuses the coupled-in solar radiation in the direction of the absorber 1'. The absorber 1', which is to also be understood as a solar panel, is located in the focus area of the reflecting surface 6' inside the upper hollow space 4 which connects to the entry window 3 of the concentrator cushion 2. In particular a pipe, through which a medium flows, or a photovoltaic element can be provided as absorber 1'. The concentrator can thus be used for concentrated photovoltaics (CPV=concentrated photovoltaics) as well as for thermal concentrated solar power (CSP=thermal concentrated solar power). During operation of the concentrator, a pressure difference is formed in the air-filled hollow spaces 4, 5, whereby the reflector film 6 is curved evenly concavely, so that the coupled-in solar radiation is focused in the absorber 1' by the reflecting surface 6'. In the state in which the hollow spaces 4, 5 are filled with compressed air, the concentrator cushion 2 is on principle designed in a self-supporting manner, so that a significantly lower weight can be realized as compared to conventional solar concentrators. As is known in the prior art, the concentrator cushion 2 is made up of individual thin-walled (plastic) films; a transparent film is provided for the entry window 3.

As can further be seen from FIGS. 1A, 1B, and 1C, a pivoting apparatus 7 for pivoting the concentrator cushion 2 is provided. The pivoting apparatus 7 has a plurality of pivoting elements in the form of pivoting rings 8 which surround the concentrator cushion 2 in its circumferential direction. Together, the pivoting rings 8 of the pivoting apparatus 7 form a tracking system, so that the concentrator cushion 2 can track the sun's path during operation. For this purpose, the pivoting apparatus 7 is set up to support the concentrator cushion 2 so as to be pivotable about at least one axis of the concentrator cushion 2, here specifically the longitudinal axis of the concentrator cushion 2.

As can further be seen from FIGS. 1A, 1B, 1C, and 2, provision is furthermore made for an anchoring apparatus 9 for the pivoting apparatus 7, wherein, in the shown embodiment, the anchoring apparatus 9 has a suspension apparatus 10 for suspending the pivoting rings 8 of the pivoting apparatus 7. The suspension apparatus 10 has a plurality of support frames 11, which are arranged so as to be spaced apart in the longitudinal direction of the concentrator cushion 2 and which have securing locations for the pivoting rings 8 of the pivoting apparatus 7. The securing locations are arranged above a plane 7' (see FIG. 2), which comprises the center of mass, of the pivoting rings 8. Each support frame 11 has a first frame element 12 on the one longitudinal side of the concentrator cushion 2 and a second frame element 13 on the other longitudinal side of the concentrator cushion 2. In addition, the support frame 11 has a third frame element 14 above the pivoting apparatus 7 comprising the concentrator cushion 2. The first frame element 12 on the one longitudinal side of the concentrator cushion 2 is connected to the second frame element 13 on the other longitudinal side of the concentrator cushion 2 via the third frame element 14. According to this, the support frame 11 extends in a curved manner from the one longitudinal side of the concentrator cushion 2 over the concentrator cushion 2 to the other longitudinal side of the concentrator cushion 2.

As can further be seen from FIGS. 1A, 1B, and 2, the first frame element 12 and the second frame element 13 in each case consist of a first straight or linear frame part 12a, 13a, respectively, and of a second straight or linear frame part 12b, 13b, respectively. The first frame part 12a, 13a is arranged substantially vertically in the operating state, wherein the lower end of the first frame part 12a, 13a is mounted in a base element 27. The second frame part 12b, 13b is angled inwardly from the upper end of the first frame part 12a, 13a towards the concentrator cushion 2.

As can further be seen from FIGS. 1A, 1B, and 2, the first frame element 12, the second frame element 13, and the third frame element 14 are embodied as elongated profile elements, which, in the shown embodiment, have an I-shaped cross section. The frame elements 12, 13, 14 are arranged in a plane substantially perpendicular to the longitudinal direction of the concentrator cushion 2.

As can further be seen from FIGS. 1A, 1B, and 1C, the suspension apparatus 10 has a plurality of, in the shown embodiment three, support frames 11 which are connected to one another via a plurality of tensioning elements 15 in the form of rope elements. The number of the support frames 11 depends on the length of the concentrator cushion 2. The support frames 11 in each case support a pivoting ring 8 which surrounds the concentrator cushion 2. In the shown embodiment, the first frame elements 12 of the support frames 11 are clamped with one another on the one longitudinal side of the concentrator cushion 2 via tensioning elements 15 on the one hand, on the other hand, provision is made for tensioning elements 15 between the second frame elements 13 of the support frames 11 on the other longitudinal side of the concentrator cushion 2. In the shown embodiment, two tension elements 15 are clamped crosswise between the support frames 11 on both longitudinal sides. The front support frame 11' and the rear support frame 11", in each case based on the longitudinal direction of the concentrator cushion 2, are clamped on both longitudinal sides of the concentrator cushion 2 on bottom elements 17 via further tensioning elements 16. In the shown embodiment, the further tensioning elements 16 are formed by end areas of tensioning elements 15 between the support frames 11.

As can be seen from FIG. 2, pivot bearing apparatuses 18 in the form of roller bearings 19, 20 are provided between the suspension apparatus 10 and the pivoting rings 8 of the pivoting apparatus 7. In the shown embodiment, a first roller bearing 19 is provided on the first frame element 12 of the suspension apparatus 10 and a second roller bearing 20 is provided on the second frame element 13 of the suspension apparatus 10.

Figure 3:
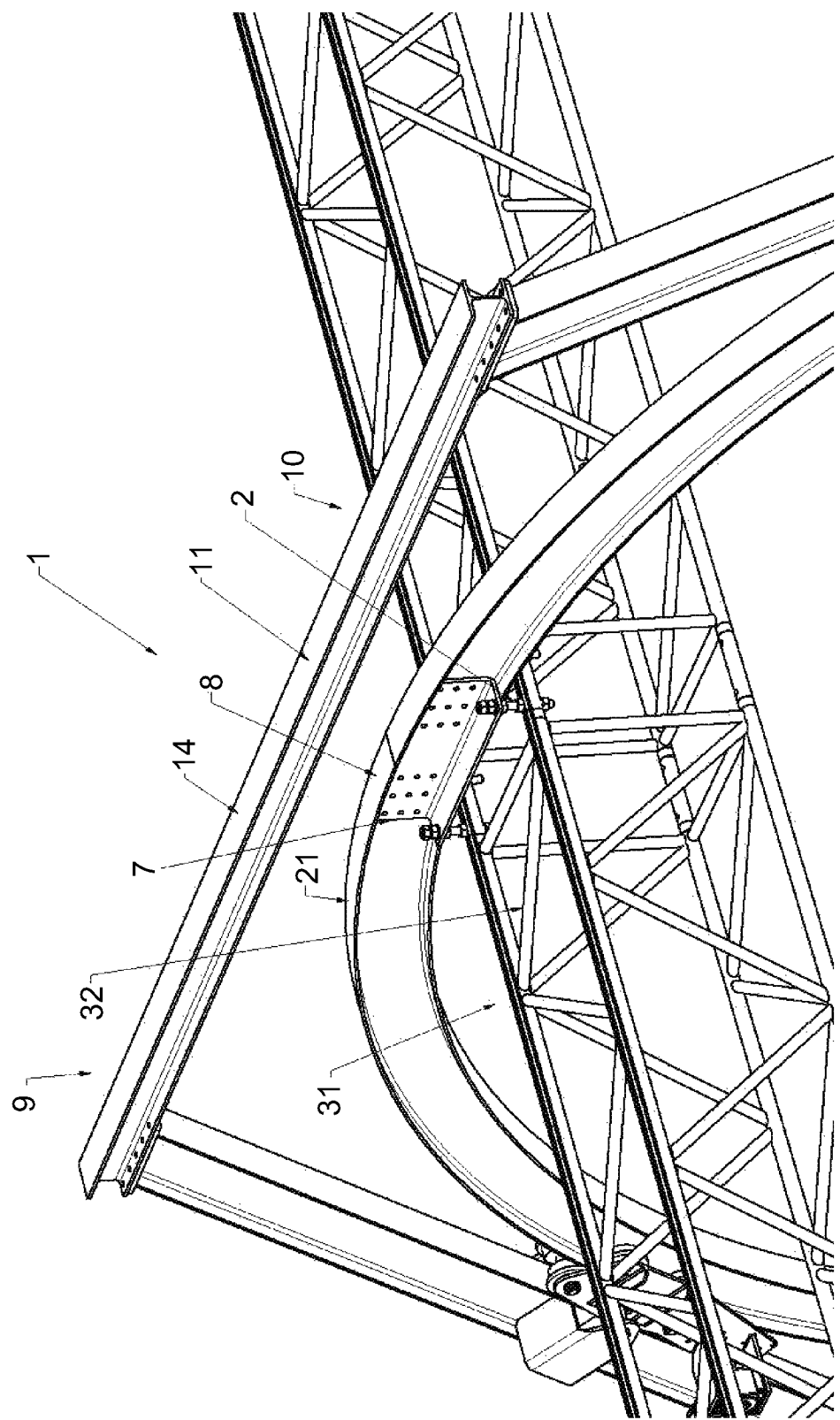
FIG. 3 shows a figurative detailed view of a section of the device according to FIGS. 1A, 1B, 1C, and 2, wherein the securing of an upper longitudinal member, which supports the concentrator cushion, can be seen on the pivoting ring.
Figure 4B:
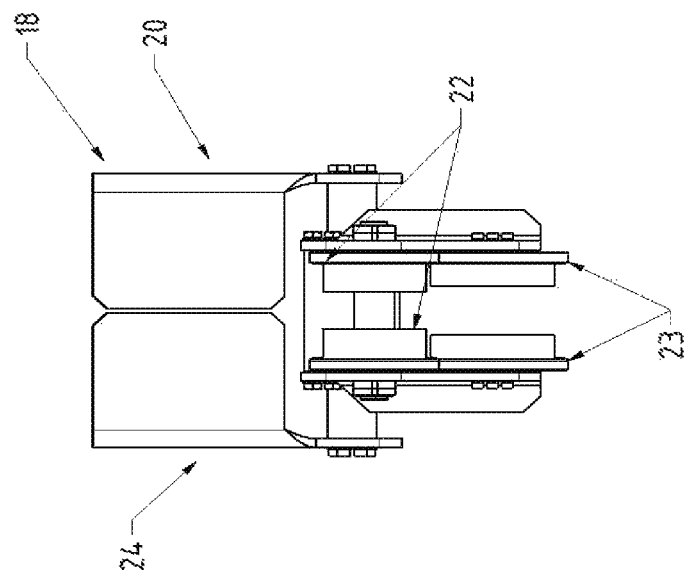
FIG. 4A and FIG. 4B in each case show a figurative view of a pivot bearing apparatus for pivoting the pivoting apparatus.
Figure 4A:
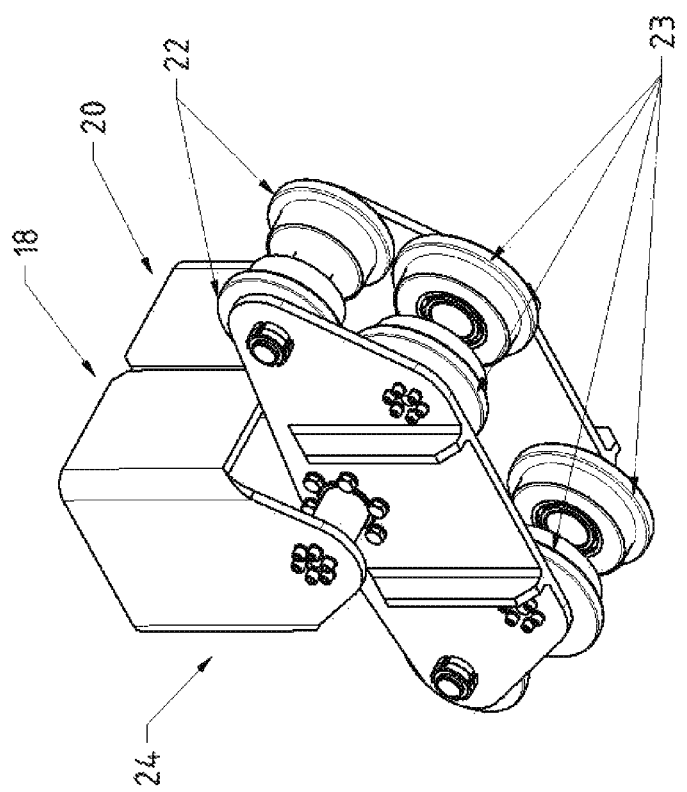

As can be seen from FIG. 3, the pivoting rings 8 in each case have a guide element 21 for the roller bearings 19, 20, wherein outer roller elements 22 roll on the top side of the guide element 21 and inner roller elements 23 roll on the inner side of the guide element 21. The roller elements 22, 23 of the roller bearings 19, 20 are assembled on traveling cranes 24 which are secured to the bottom side of the pivoting ring 8. In the shown embodiment, the pivoting rings 8 in each case have an I-shaped cross-section, wherein upper flanges 25 of the I-shaped pivoting rings 8 are embodied as guide elements 21 for the roller bearings 19, 20.

As can be seen from FIG. 1B, provision is made on the suspension apparatus 10 for a covering apparatus 26 which can be transferred between a protective position which at least partially covers the concentrator cushion 2, and a stowage position which arranges the concentrator cushion 2 so as to be substantially completely exposed. In the shown embodiment, a plurality of covering apparatuses 26 are in each case secured between two adjacent support frames 11 on the first frame elements 12 on the one longitudinal side of the concentrator cushion 2 or on the first frame elements 13, respectively, on the other longitudinal side of the concentrator cushion 2. In the shown embodiment, the covering apparatuses 26 consist of a plurality of slat elements which are connected to one another and which can be transferred between a pushed-together position and a pulled-apart position. In the illustration of FIG. 1B, the two front covering apparatuses 26 are arranged in the pushed-together position in which wind forces can act on the lower half of the concentrator cushion 2. In contrast, the two rear covering apparatuses 26 are arranged in the pulled-apart position, in which wind forces can be kept away from the lower area of the concentrator cushion 2. The covering apparatuses 26 can be transferred between the stowage position and the protective position in a motor-driven manner or manually.

As can be seen from FIGS. 1A, 1B, 2, and 3, the device 1 also has a retaining apparatus 31 for the concentrator cushion 2 which (in each case based on the operating position) has an upper longitudinal member 32 and a lower longitudinal member 33. The upper longitudinal member 32 supports the absorber 1' (see FIG. 2), whereas the lower longitudinal member 33 contributes to the discharge of external loads. Both longitudinal members 32, 33 extend in the longitudinal direction of the concentrator cushion 2 between a front end piece 2' and a rear end piece 2" on the front sides of the concentrator cushion 2 (see FIG. 1C).

As can further be seen from the drawing, the upper longitudinal member 32 is suspended on the inner side of the upper area of the pivoting rings 8. The lower longitudinal member 33 is also attached on the inner side, but in the lower area of the pivoting rings 8. The upper longitudinal member 32 is connected to a top side of the concentrator cushion 2, the top side facing the solar radiation. The lower longitudinal member 33 is connected to a bottom side of the concentrator cushion 2, the bottom side facing away from the solar radiation. In the shown embodiment, the longitudinal members 32, 33 are embodied as lattice trusses. As can be seen from FIG. 2, the longitudinal members are arranged on a plane 7" which comprises the center point of the pivoting ring 8.

Figure 5:
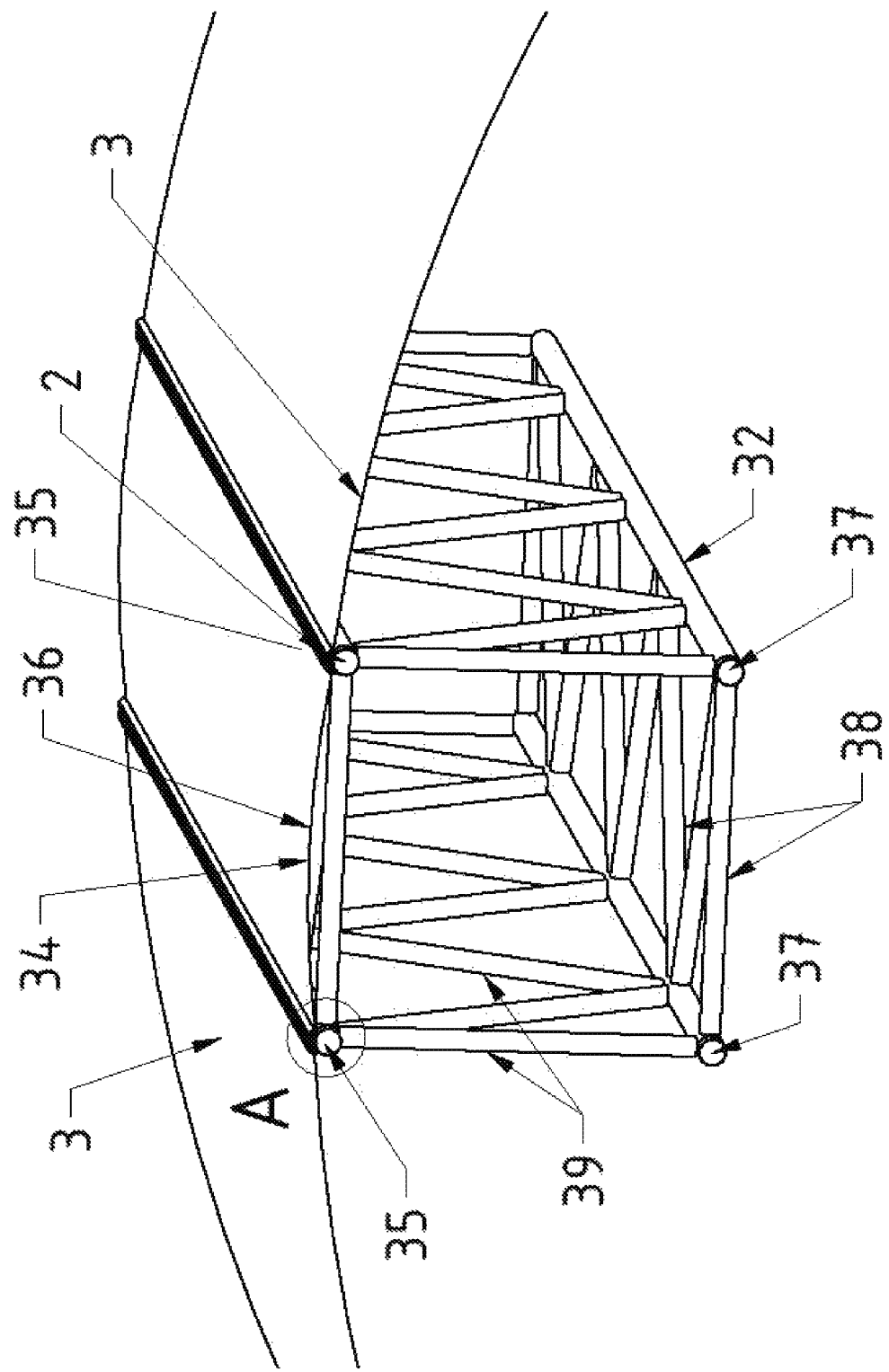
FIG. 5 shows a figurative detailed view of a section of the device according to FIGS. 1A, 1B, 1C to 3, wherein the securing of the concentrator cushion to the upper longitudinal member can be seen.

As can be seen from FIG. 5, the upper longitudinal member 32 is arranged on an upper passage opening 34 of the concentrator cushion 2, which is closed in a substantially air-tight manner on all sides. For this purpose, the upper longitudinal member 32 has two longitudinal belts 35 which run in the longitudinal direction of the concentrator cushion 2 (i.e. in the direction of its longer extension) and which are in each case connected to longitudinal edges of the concentrator cushion 2 on both sides of the upper passage opening 34 of the cover film element 3" in a substantially air-tight manner. The upper longitudinal member 32 thus has substantially the same width as the passage opening 34 of the concentrator cushion 2, which extends in the longitudinal direction of the concentrator cushion 2 substantially over the entire length thereof. To prevent air from escaping from the upper hollow space 4 of the concentrator cushion, a sealing film strip 36, by means of which the upper passage opening 34 of the concentrator cushion 2 is closed, is arranged between the longitudinal belts 35. The sealing film strip 36 is made of a transparent plastic material, in particular of ethylene-tetrafluoroethylene (ETFE).

The lower longitudinal member 33 is arranged on a substantially air-tight closed lower passage opening 34' of the concentrator cushion 2 (see FIG. 1B), wherein the lower passage opening 34' extends on a bottom film element 3' of the concentrator cushion 2, which bottom film element 3' adjoins the lower hollow space 5. The upper 34 and the lower passage openings 34' have the same longitudinal extension as the upper longitudinal member 32 or the lower longitudinal member 33, respectively. The lower longitudinal member 33 is thereby embodied substantially identically as the upper longitudinal member 32. The connection between the lower longitudinal member 33 and the bottom film element 3' is furthermore designed in accordance with the connection between the upper longitudinal member 33 and the cover film element 3". The following explanations relating to the upper longitudinal member 32 are thus to be understood accordingly for the lower longitudinal member 33.

As can further be seen from FIG. 5, the upper longitudinal member 32 has two further longitudinal belts 37 which extend parallel to the longitudinal belts 35 in the longitudinal direction of the concentrator cushion 2. The further longitudinal belts 37 of the upper longitudinal member 32 are arranged inside the upper hollow space of the concentrator cushion 2. The longitudinal belts 35 and the further longitudinal belts 37 of the upper longitudinal member 32 are connected to one another via filling bars 38 by forming intermediate spaces. Further filling bars 39 are provided between the longitudinal belts 35 and the further longitudinal belts 37.

As can be seen in detail from FIGS. 6A, and 6B, profile elements 40 are arranged on the longitudinal belts 35 of the upper longitudinal member 32. On the one side, each profile element 40 is connected to a connecting element 41 for the substantially air-tight connection to the adjacent longitudinal edge of the cover film element 3", and, on the other side, to a further connecting element 42 for the substantially air-tight connection to the adjacent longitudinal edge of the sealing film strip 36. FIG. 6B shows an embodiment in which the profile element 40 is attached as independent component to the top side of the longitudinal belt 35. According to FIG. 6B, the profile element 40 is formed in one piece with the longitudinal belt 35 of the upper longitudinal member 32.

As can be seen from FIGS. 6A, and 6B, provision is made in the case of this embodiment on the longitudinal belts 35 of the upper longitudinal member 32 for retaining elements 40' for the positive connection to corresponding retaining elements (not shown) on the pivoting apparatus 7, in order to suspend the upper longitudinal member 32 on the pivoting apparatus 7. In the shown embodiment, the profile element 40 has retaining openings 40", in which the corresponding retaining elements for the connection of the pivoting apparatus are received, for forming the retaining elements 40', the retaining openings 40" extending in the longitudinal direction of the concentrator cushion 2.

In the embodiment alternatives of FIGS. 5, 6A, and 6B, provision is made as connecting element 41 for a keder rail 43 in which a keder element 44 is received so as to form a seal on the corresponding longitudinal edge of the cover film element 3". As further connecting element 42, provision is accordingly made for a further keder rail 45 in which a further keder element 46 is received so as to form a seal on the corresponding longitudinal edge of the sealing film strip 36.

Figure 7A:
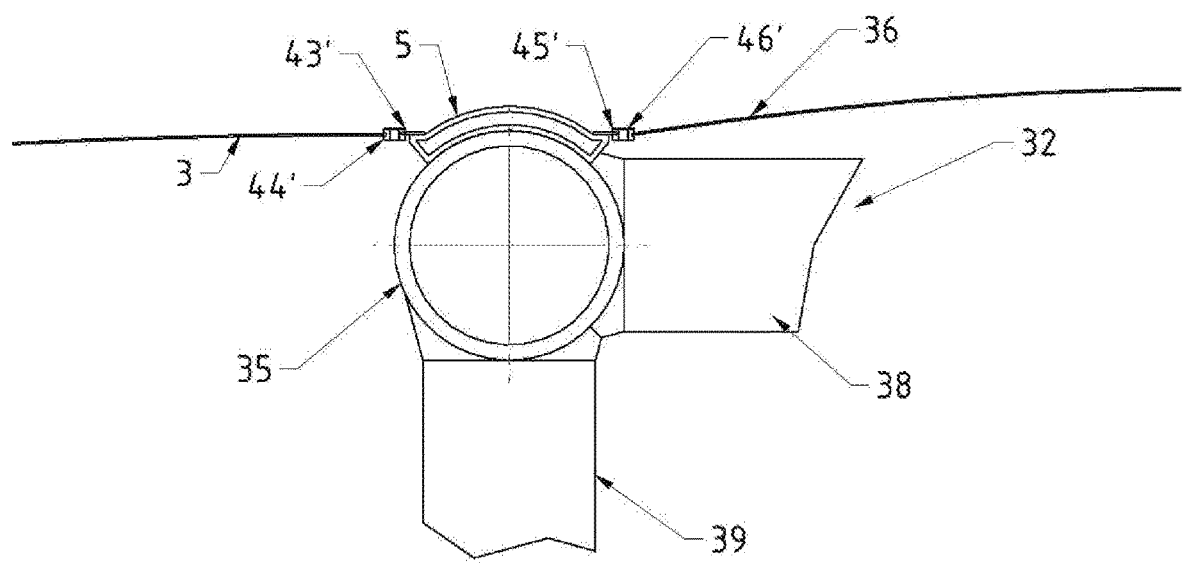
FIG. 7A and FIG. 7B in each case show a section of an alternative embodiment according to the invention of the device, in which an air-tight zipper for connecting the concentrator cushion to the upper longitudinal member is provided.
Figure 7B:
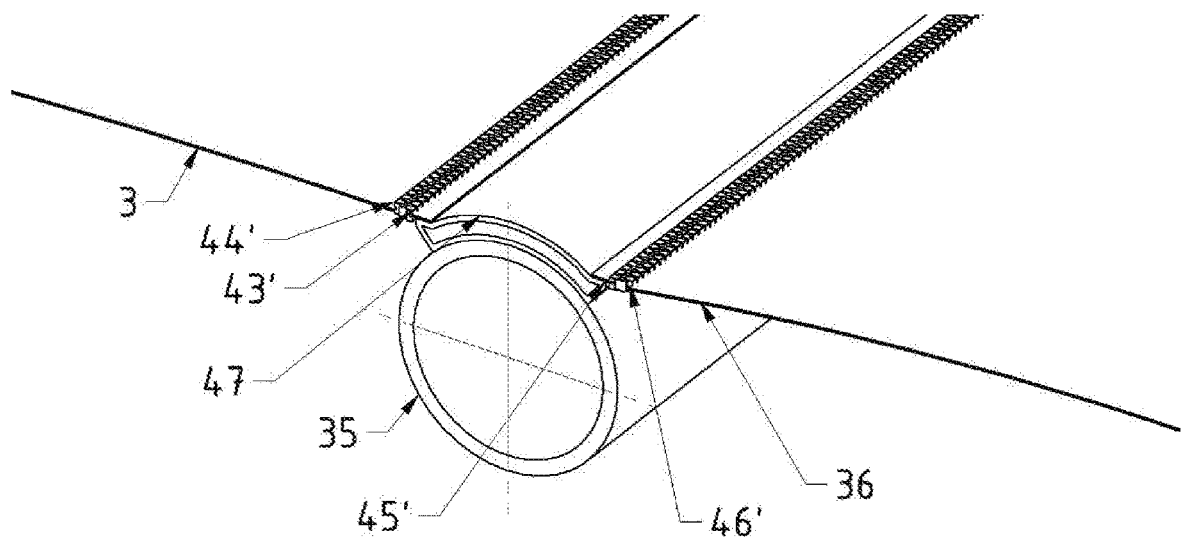

FIGS. 7A, 7B show an alternative embodiment of the connection between the upper longitudinal member 32 and the cover film element 3". In the case of this embodiment, provision is made as connecting element 41 for a zipper element 43' for the connection to a corresponding zipper element 44' on one of the longitudinal edges of the cover film element 3". As further connecting element 42, provision is accordingly made for a further zipper element 45' for the connection to a corresponding further zipper element 46' of the sealing film strip 36. The zipper elements 43', 45' are arranged on the top side of a profile 47 which extends in the longitudinal direction of the concentrator cushion 2 and which is arranged on the top side on the longitudinal belt 35 of the upper longitudinal member 32.

Figure 8A:
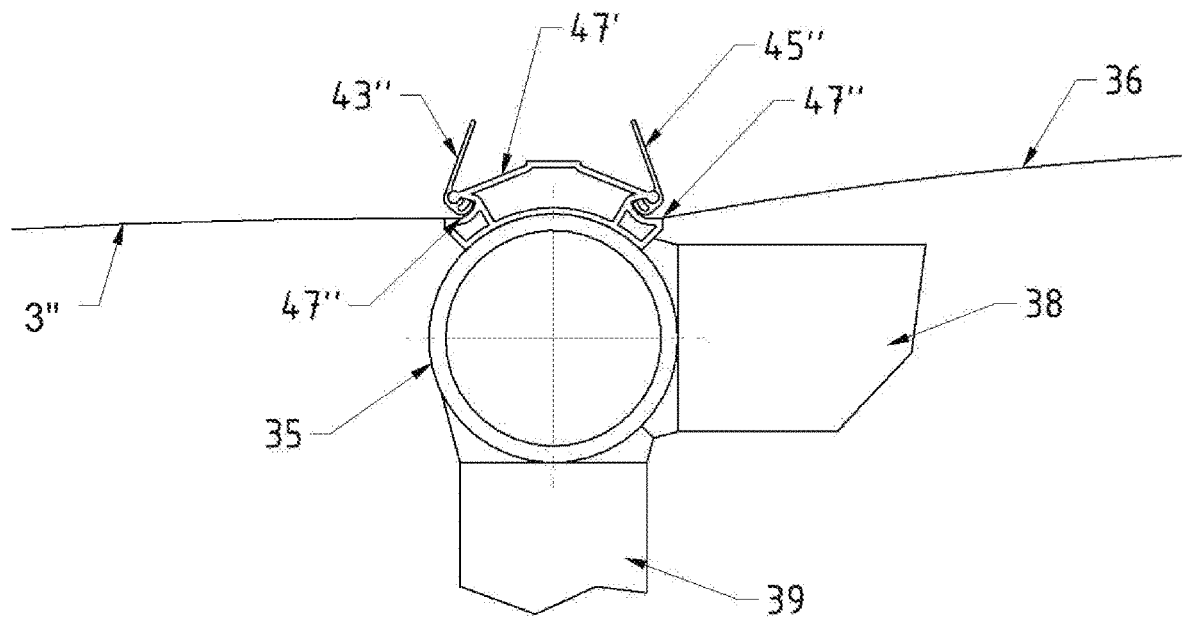
FIG. 8A and FIG. 8B in each case show a section of a further alternative embodiment according to the invention of the device, in which the longitudinal edges of the concentrator cushion are clamped to the upper longitudinal belts of the longitudinal member, wherein the released position is illustrated in FIG. 8A and the clamped position is illustrated in FIG. 8B.
Figure 8B:
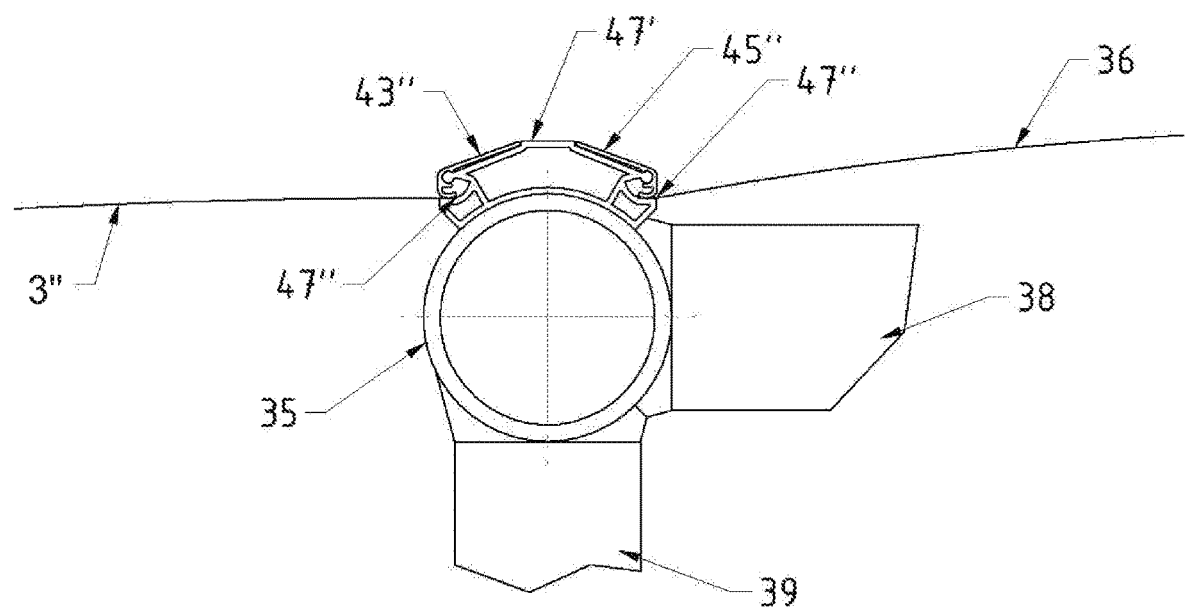

FIGS. 8A, and 8B show a further alternative embodiment in which provision is made as connecting element 41 for a clamping part 43" for clamping the associated longitudinal edge of the cover film element 3". Provision is accordingly made as further connecting element 42 for a further clamping part 45" for clamping the associated longitudinal edge of the sealing film strip 36. For this purpose, provision is made on the top side of the longitudinal belt 35 for a profile part 47' which extends in the longitudinal direction of the concentrator cushion 2. The profile part 47' has bearing surfaces 47" which cooperate with the clamping part 43" or the further clamping part 45", respectively. The clamping part 43" can be pivoted between a position which releases the longitudinal edge of the cover film element 3" (see FIG. 8A) and a position which clamps the longitudinal edge of the cover film element 3" (see FIG. 8B). The further clamping part 45" can accordingly be pivoted between a position which releases the longitudinal edge of the sealing film strip 36 (see FIG. 8A) and a position which clamps the longitudinal edge of the sealing film strip 36 (see FIG. 8B).

Figure 9:
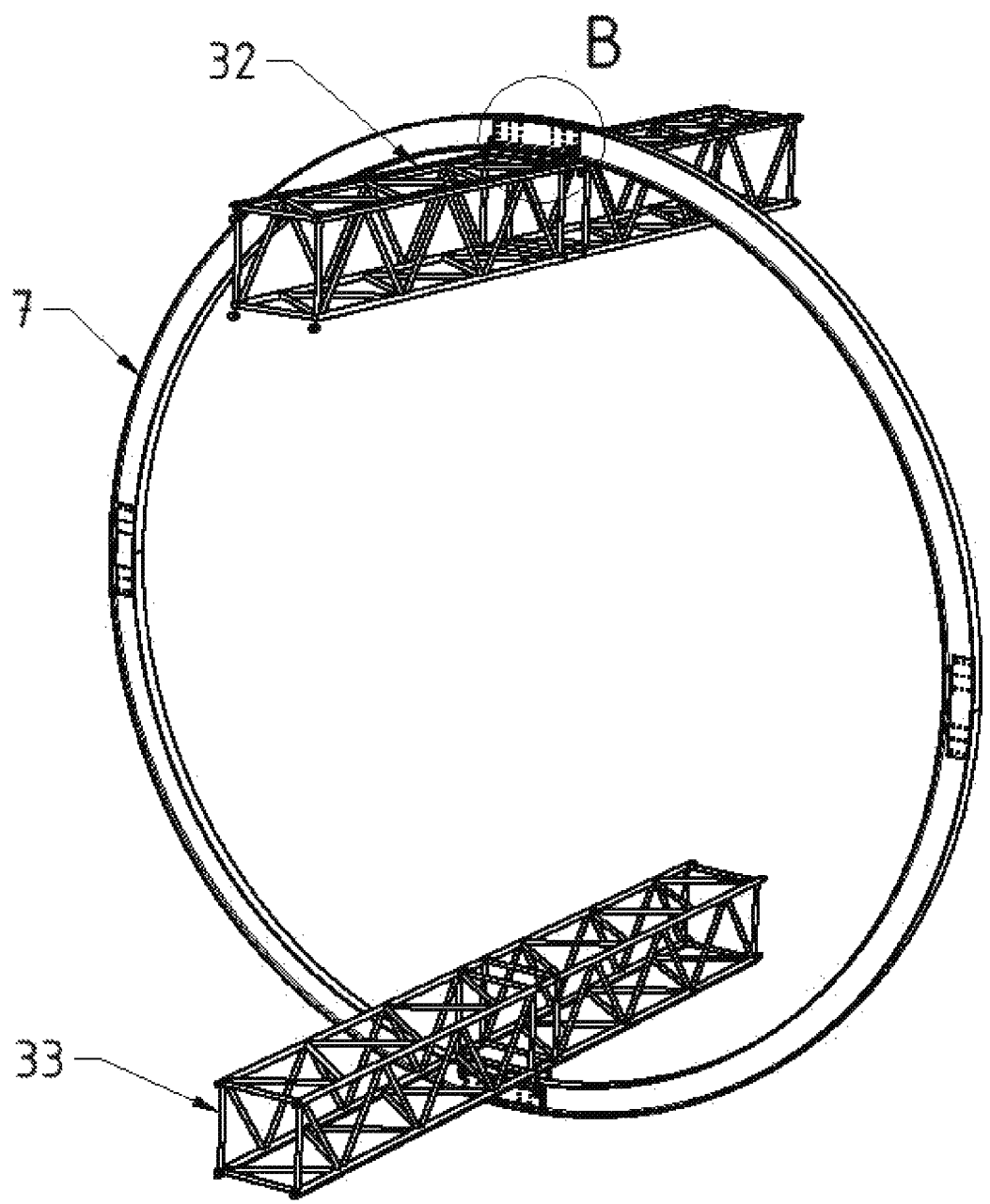
FIG. 9 shows an enlarged figurative view of one of the pivoting rings of the concentrator device according to FIGS. 1A, 1B, and 1C to 3, wherein the longitudinal members are assembled on the pivoting ring so as to be height-adjustable.

As can be seen from FIG. 9, provision is made between the upper longitudinal member 32, the retaining apparatus 31 and the pivoting apparatus 7 for an adjusting device 48 by means of which the distance between the upper longitudinal member 32 and the pivoting apparatus 7 can be adjusted. A further adjusting device is provided between the lower longitudinal member 32 and the pivoting apparatus 7, wherein the following explanations relating to the adjusting device 48 for the upper longitudinal member 32 are to refer analogously to the adjustment of the lower longitudinal member 33. The adjusting device 48 is connected to both longitudinal belts 35 of the upper longitudinal member 32 on the one hand and to a horizontal securing flange 49 on the other hand.

Figure 10A:
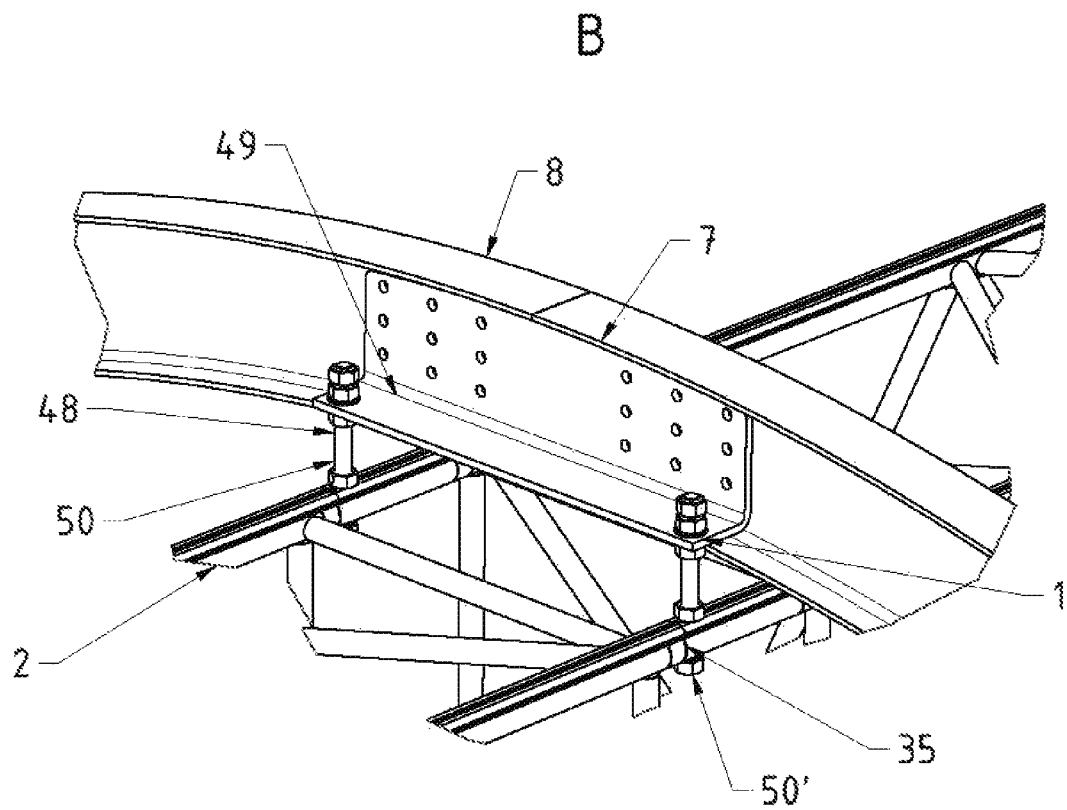
FIG. 10A shows an enlarged illustration of detail B, which is illustrated in FIG. 9 by means of a circle, wherein the adjusting device is adjusted to a larger distance between the upper longitudinal member and the pivoting ring by means of a threaded rod.
Figure 10B:
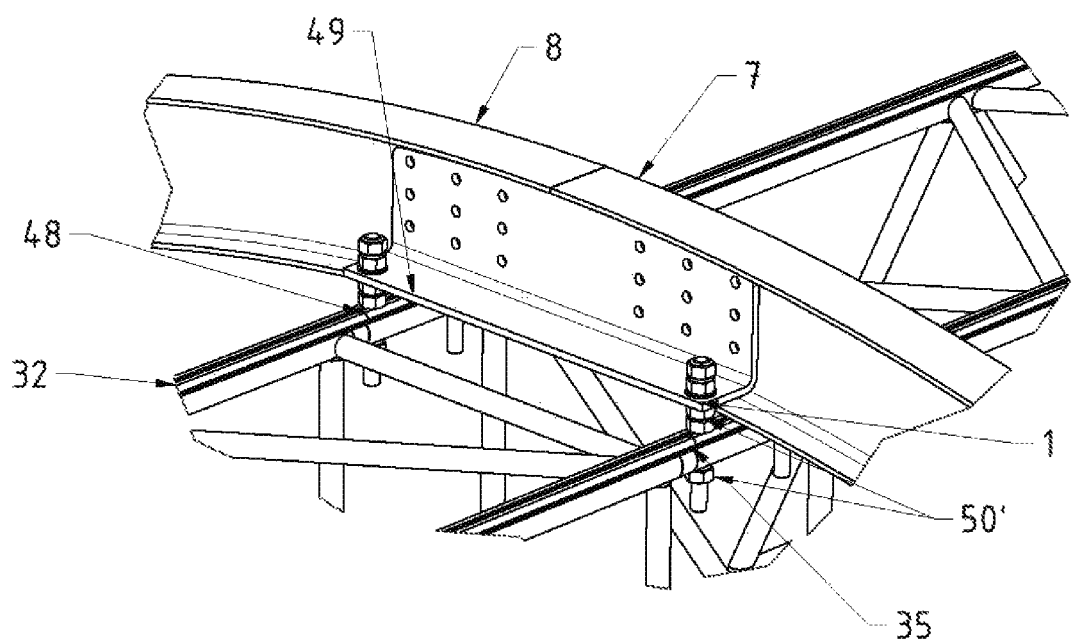
FIG. 10B shows a detailed view according to FIG. 10A, wherein the longitudinal member was guided closer to the pivoting ring by adjusting the threaded rod.
Figure 11A:
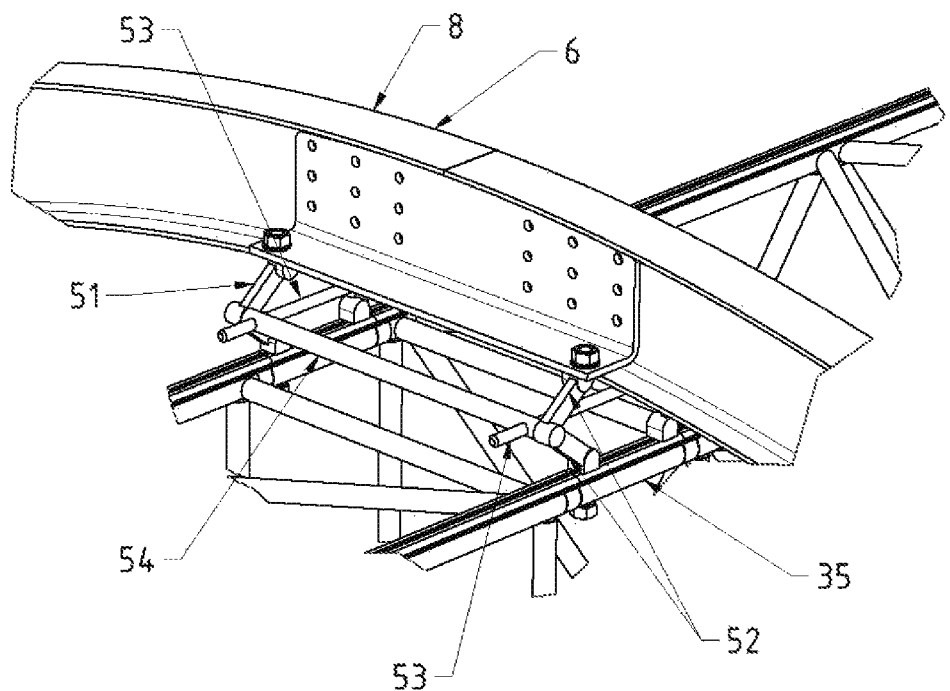
FIGS. 11A, 11B, 11C and 11D show detailed views of an alternative embodiment of the adjusting device, in which toggle lever elements are provided between the pivoting ring and the upper longitudinal member for adjusting the distance, wherein the toggle lever elements in FIGS. 11A, 11C are adjusted to a larger distance between the pivoting ring and the upper longitudinal member than in FIGS. 11B, 11D.
Figure 11B:
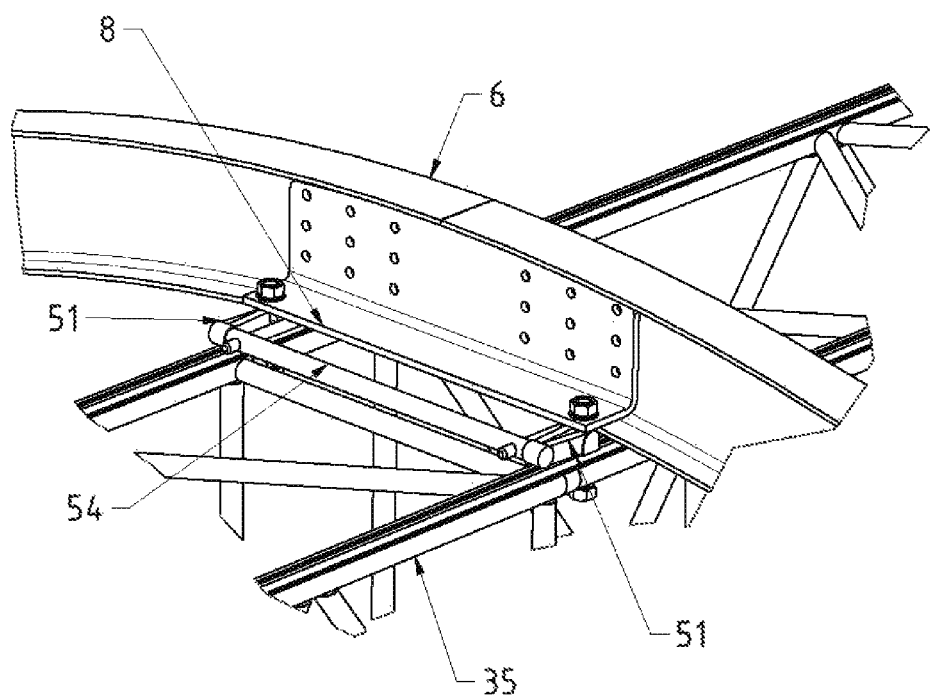
Figure 11C:
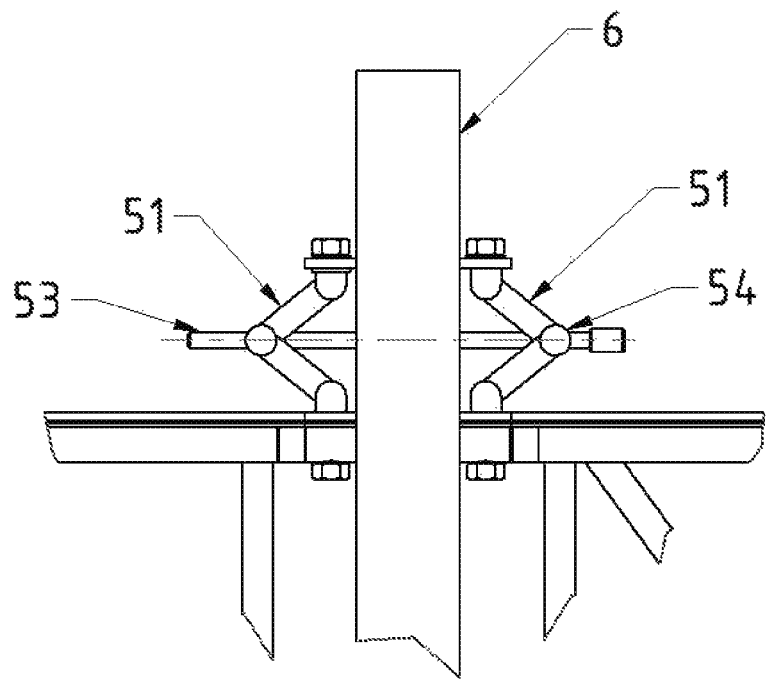
Figure 11D:
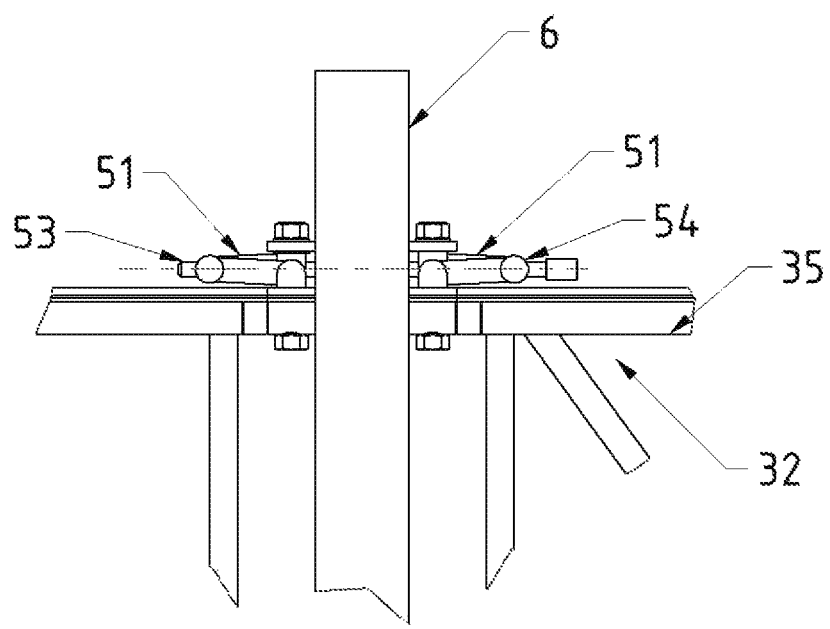
Figure 12A:
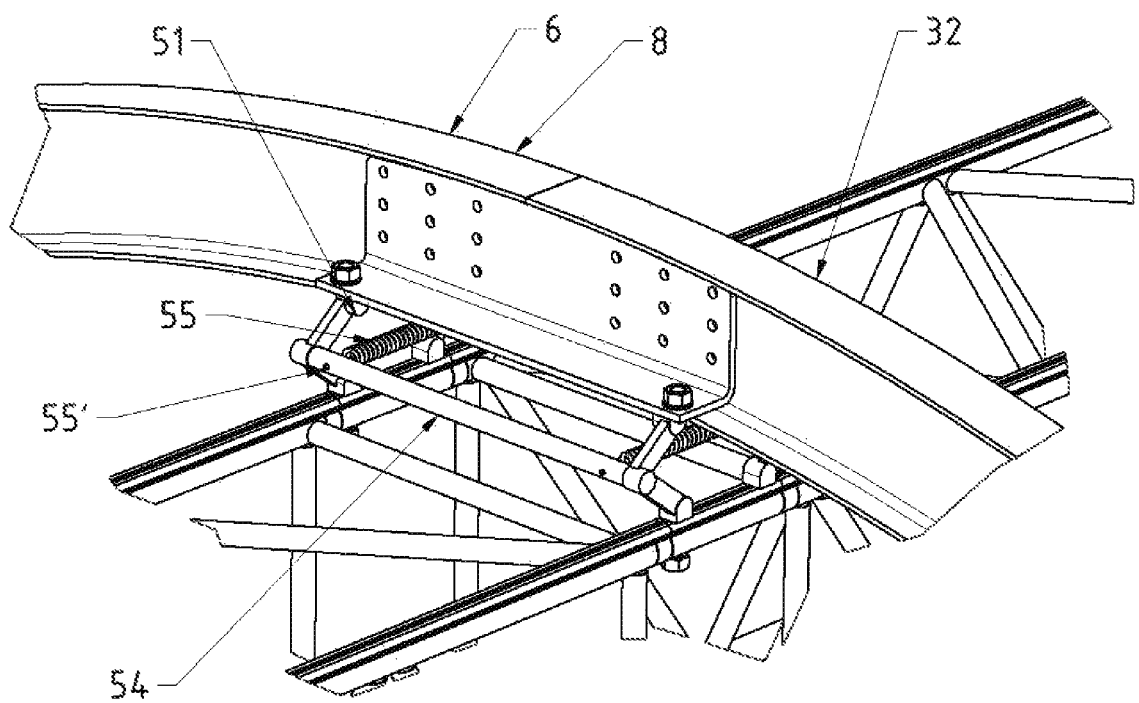
FIGS. 12A, 12B, 12C and 12D show detailed views of an alternative embodiment of the adjusting device, in which the toggle lever elements can automatically track the matching distance between the pivoting ring and the upper longitudinal member against the force of a spring element, wherein the toggle lever elements in FIGS. 12A, 12C are adjusted to a larger distance between the pivoting ring and the upper longitudinal member than in FIGS. 12B, 12D.
Figure 12B:
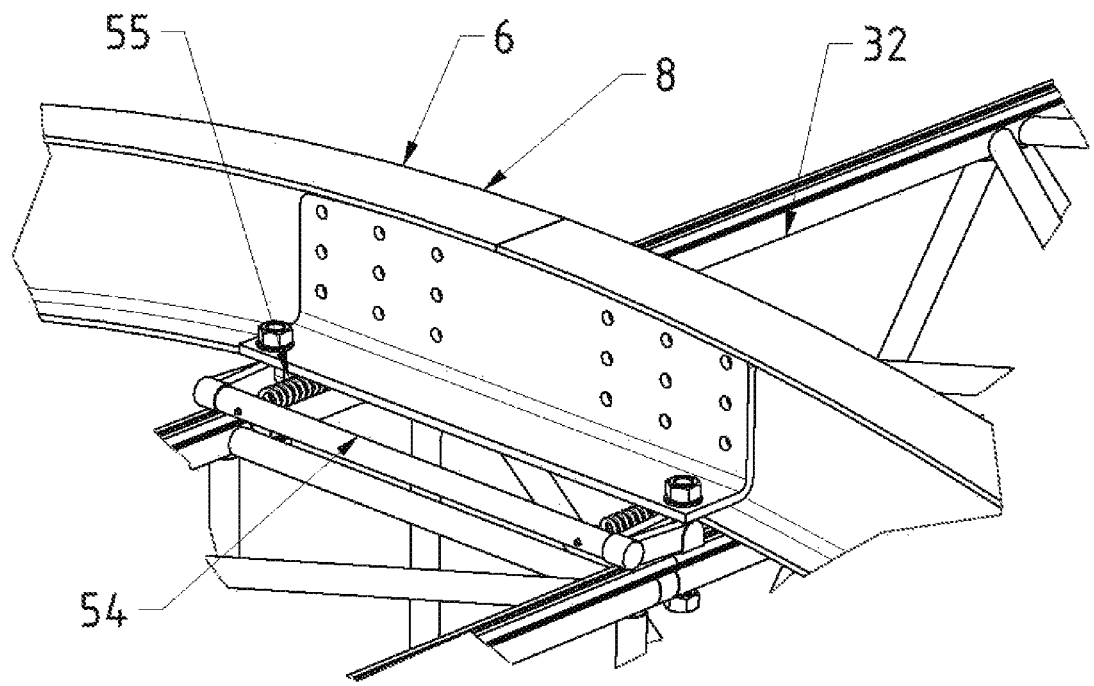
Figure 12C:
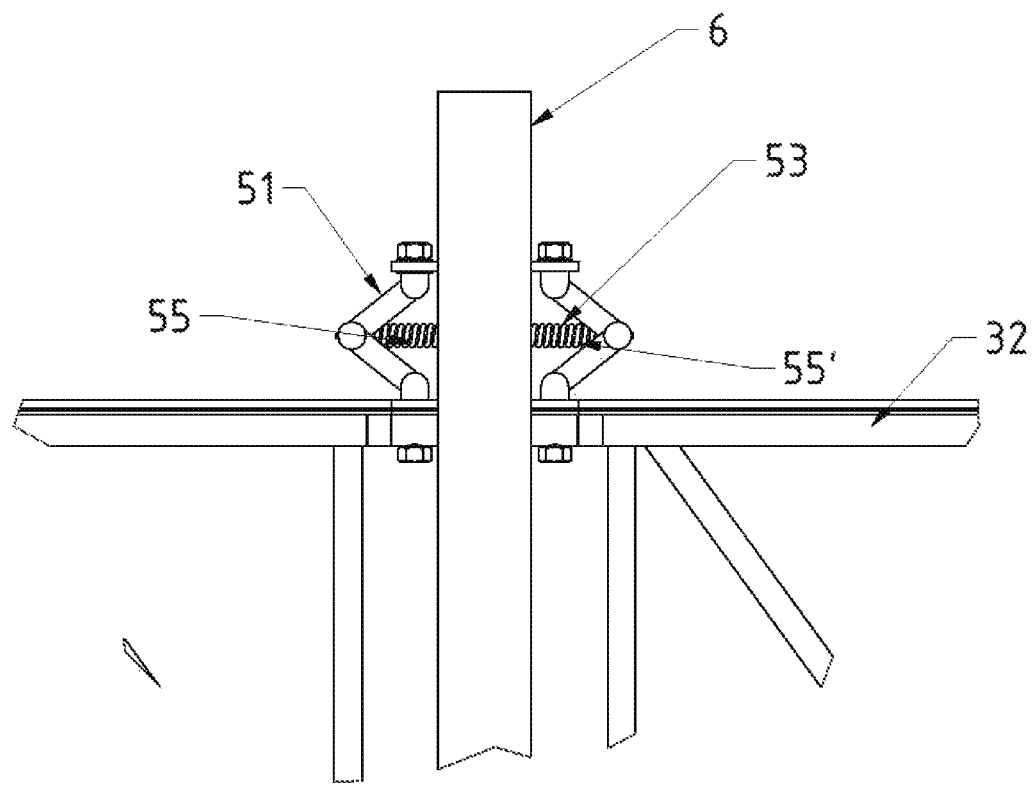
Figure 12D:
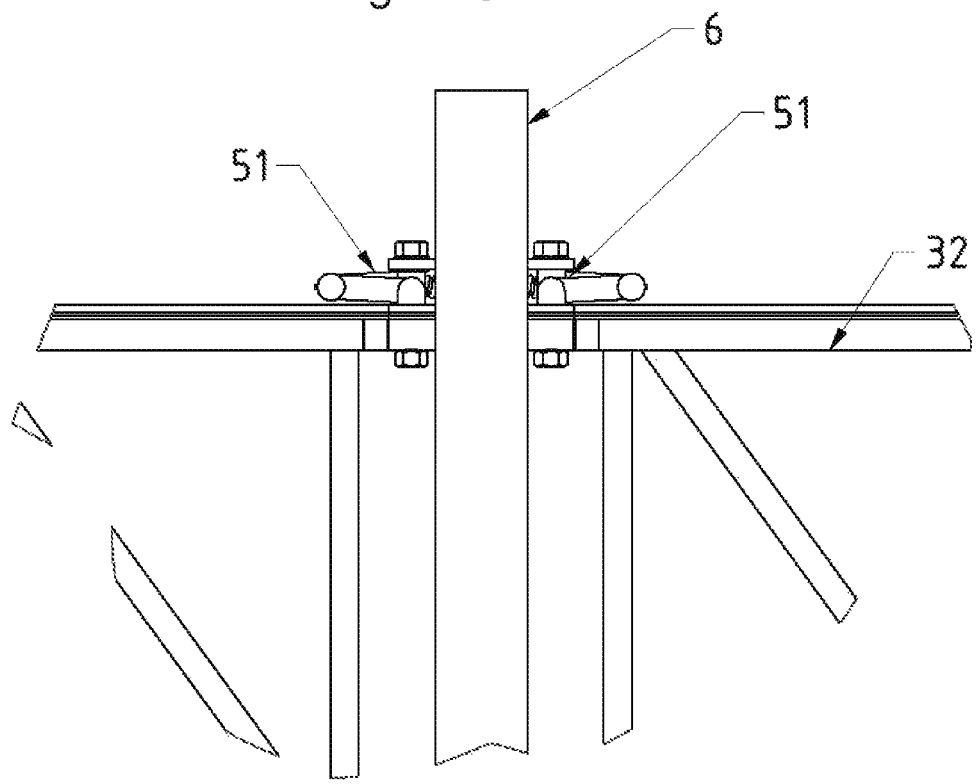

According to FIGS. 10A and 10B, the adjusting device 48 has an adjusting element in the form of a threaded rod 50 which cooperates with threaded nuts 50' in order to be able to manually adjust the distance between the upper longitudinal member 32 and the pivoting apparatus 7. In the embodiment of FIGS. 10A and 10B, the threaded rod 50 is arranged substantially perpendicular to the longitudinal direction of the upper longitudinal member 32. The longitudinal belts 35 of the upper longitudinal member 32 are in each case connected to at least one threaded rod 50.

According to FIGS. 11A, 11B, 11C, and 11D, a plurality of toggle lever elements 51 which, on their ends, have leg parts 52 (see FIG. 11A) which are connected to one another in an articulated manner, is arranged between the upper longitudinal member 32 and the pivoting apparatus 7. To adjust the distance between the pivoting apparatus 7 and the upper longitudinal member 32, the opening angle between the leg parts 52 of the toggle lever elements 51 is adapted. In the shown embodiment, two toggle lever elements 51, which are spaced apart from one another in the longitudinal direction and which are coupled to one another via at least one adjusting element 53 in the form of a threaded rod, are in each case secured to both longitudinal belts 35. By adjusting the threaded rod, the opening angle of the toggle lever elements 51 and thus the distance between the pivoting apparatus 7 and the upper longitudinal member 32 can be adjusted. In the shown embodiment, two adjusting elements 53 are horizontally arranged substantially parallel to the longitudinal direction of the upper longitudinal member 32.

As can further be seen from FIGS. 11A, 11B, 11C, and 11D, the toggle lever elements 53 are connected to one another in pairs via connecting rods 54 on the opposite longitudinal belts 35 of the upper longitudinal member 32. In the shown embodiment, provision is made for two adjusting elements 53 in the form of threaded rods, which are connected to the connecting rods 54 so as to be capable of being adjusted.

According to FIGS. 12A, 12B, 12C, and 12D, the adjusting device 48 has a drive element 55 by means of which the distance between the pivoting apparatus 7 and the upper longitudinal member 32 can be automatically readjusted as a function of a load state of the upper longitudinal member 32 (i.e. in particular as a function of a vertical force as a result of the creeping of the concentrator cushion 2). As drive element 55, provision is made for a spring element 55' in such a way that the upper longitudinal member 32 can be guided closer to the pivoting ring 8 against the force of the spring element 55', depending on the load state of the upper longitudinal member 32. In the shown embodiment, the adjusting elements 53 are embodied as drive elements 55 between the connecting rods 54.

Figure 13A:
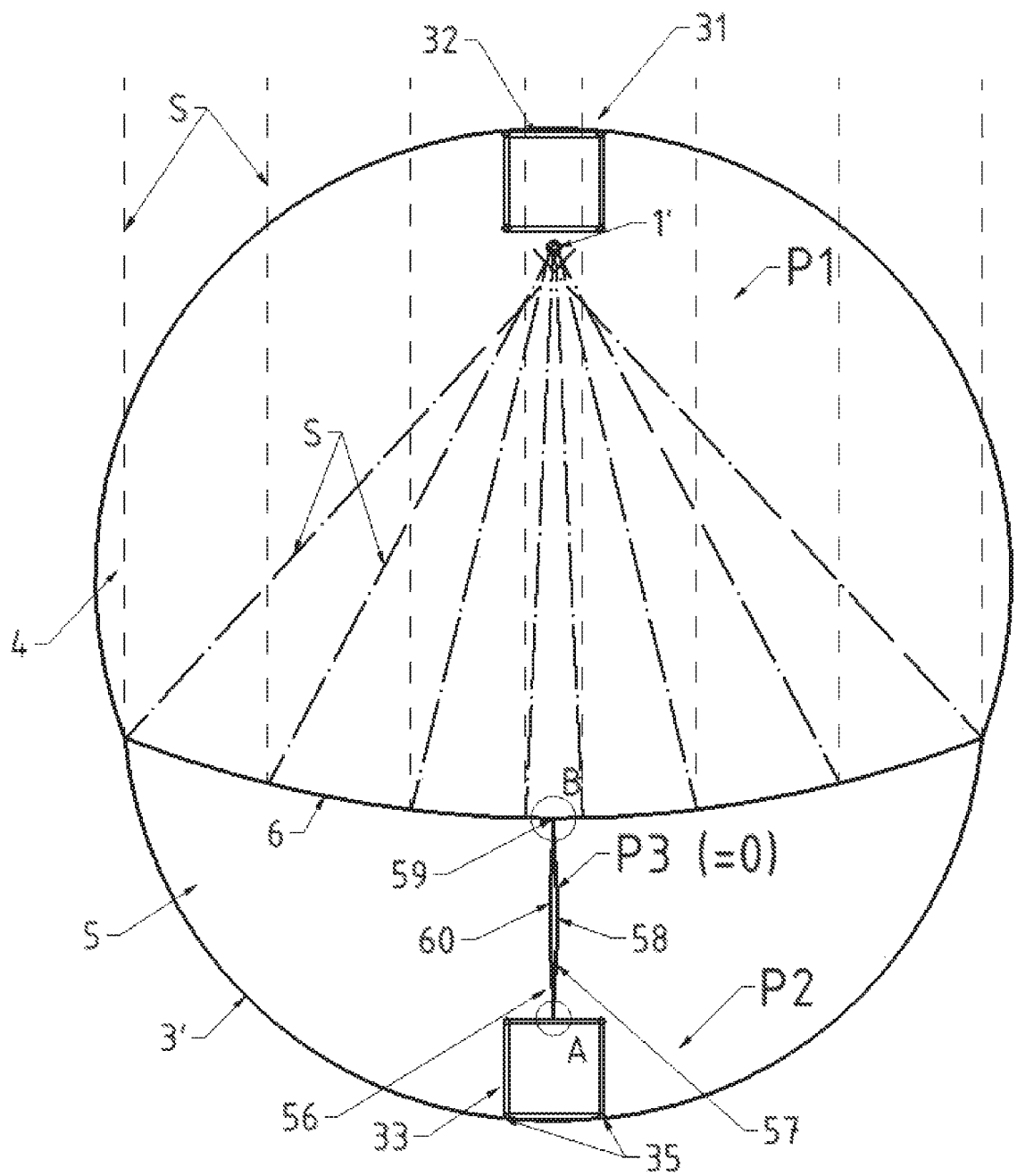
Figure 13B:
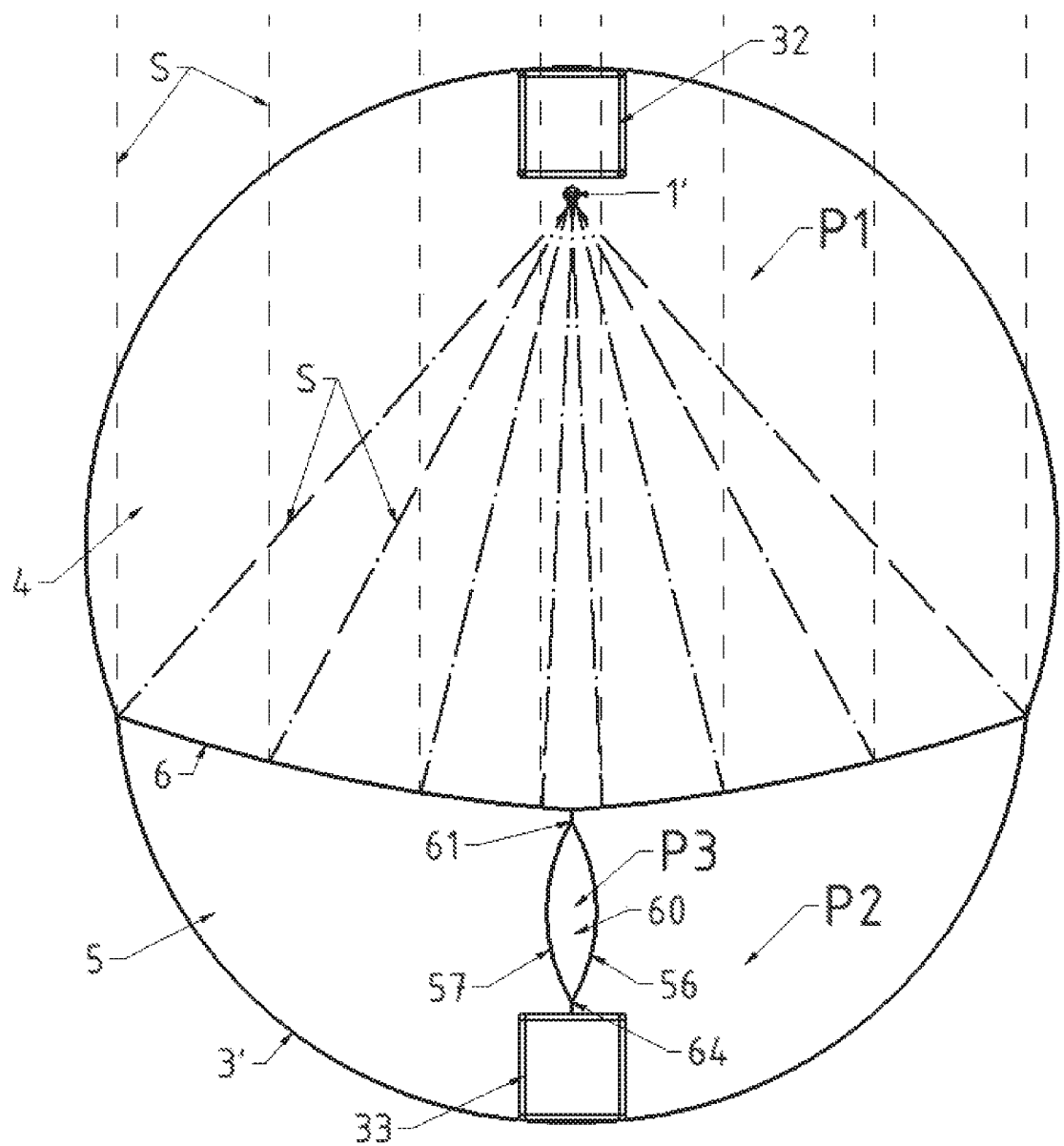

FIGS. 13A, 13B illustrate a further embodiment of the concentrator device 1, wherein merely the differences over the previous embodiment alternatives will be explained in the following.

According to FIGS. 13A, 13B the device 1 comprises an adjusting device 56 for adjusting the curvature of the reflector film 6 of the concentrator cushion 2. For this purpose, the adjusting device 56 comprises a tensioning element 57 between the lower longitudinal member 33 of the retaining apparatus 31 and the reflector film 6, by which, in the tensioned state of the tensioning element 57, a tensile force is transferable on the reflector film 6. Thus it is possible to pull the reflector film 6 at the contact area of the tensioning element 57 in the direction of the lower longitudinal member 33 of the retaining apparatus 31, so that the curvature of the reflector film 6 is in cross-section approached to a parabola. In this manner the incident, substantially parallel sun rays S (see the dashed lines in FIGS. 13A, 13B) are reflected at the reflective surface which is, due to the tensioning element 57, substantially parabolic, so that the reflected sun rays S (see the dashed and dotted lines in FIGS. 13A, 13B) are focused accurately on the absorber 1' extending in the longitudinal direction of the concentrator cushion 2.

In the illustrated embodiment, a tensioning film element 58 is provided as a tensioning element 57 for adapting the curvature of the reflector film 6, said tensioning film element 58 being tensioned between the lower longitudinal member 33 and the reflector film 6 in the inflated state of the concentrator cushion 2. The tensioning element 57 in the form of the tensioning film element 58 contacts a middle longitudinal section 59 of the reflector film 6, which extends substantially in the middle between the longitudinal edges of the reflector film 6 in the longitudinal direction of the concentrator cushion 2. The tensioning film element 58 consists of a resilient material which is preferably a plastic material. To evenly influence the curvature of the reflector film 6 in the longitudinal direction of the concentrator cushion 2, the connection between the tensioning film element 58 and the reflector film 6 extends substantially over the entire length of the reflector film 6.

As may be seen from FIGS. 13A, 13B, the tensioning film element 58 comprises an inflatable hollow chamber 60. By inflating the hollow chamber 60 of the tensioning film element 58 the normal distance between the lower longitudinal member 33 and the reflector film 6 may be changed so as to adjust the tensile force transferred from the tensioning element 67 to the reflector film 6. FIG. 13A illustrates the tensioning film element 58 in the uninflated state of the hollow chamber 60, wherein the tensioning film element 58 has an elongated shape. FIG. 13B illustrates the tensioning film element 58 in the inflated state of the hollow chamber 60, wherein the tensioning film element 58, due to the filling of the hollow chamber 60, exists in a shortened or compressed state, so that a tensile force is exerted on the reflector film 6. Accordingly, the filling pressure P3 of the hollow chamber 60 may be increased for adapting the curvature of the reflector film 6. In the upper hollow space 4 a filling pressure P1 is set, and in the lower hollow space 5 a filling pressure P2 is set. The filling pressure P1 in the upper hollow space 4 is larger than the filling pressure P2 in the lower hollow space 5. In the uninflated state of the hollow chamber 60 pursuant to FIG. 13A the filling pressure P3 is substantially zero. In the inflated state of the hollow chamber 60 pursuant to FIG. 13B the filling pressure P3 is larger than the filling pressure P2 in the lower hollow space 5 of the concentrator cushion 2.

Figure 15:
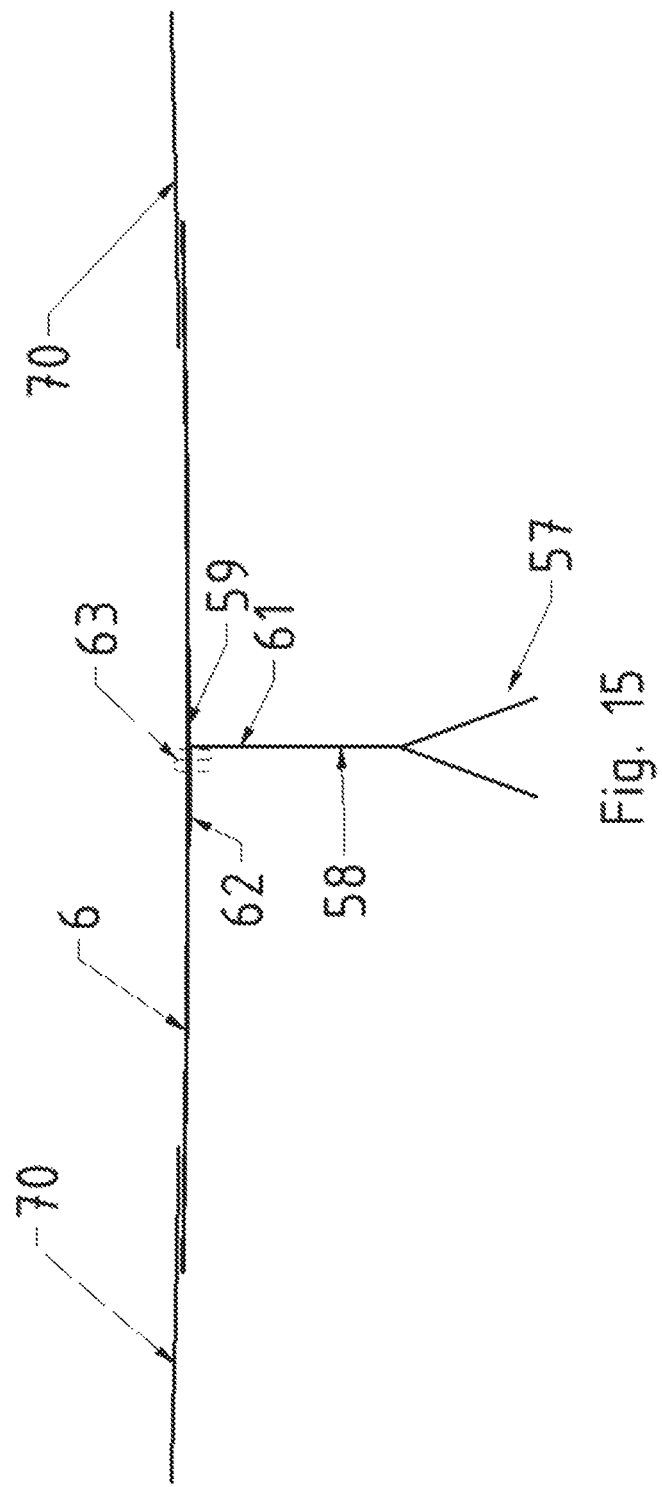
FIG. 15 shows the detail B, which is in FIG. 13A illustrated by means of a circle, in an enlarged scale.

As may be further gathered from FIGS. 13A, 13B, and especially from FIG. 15, the tensioning film element 58 comprises a tensioning section 61 which contacts the middle longitudinal section 59 of the reflector film 6 substantially rectangularly. The tensioning section 61 transits into a connecting section 61 (cf. FIG. 15) which is connected by a seam 63 with the reflector film 6 in the illustrated embodiment. It is to be understood that other join connections, such as adhesive joints, may also be provided between the tensioning element 57 and the reflector film 6. FIG. 15 furthermore illustrates schematically side wall film elements 70 which adjoin the reflector film 6 laterally.

Figure 14:
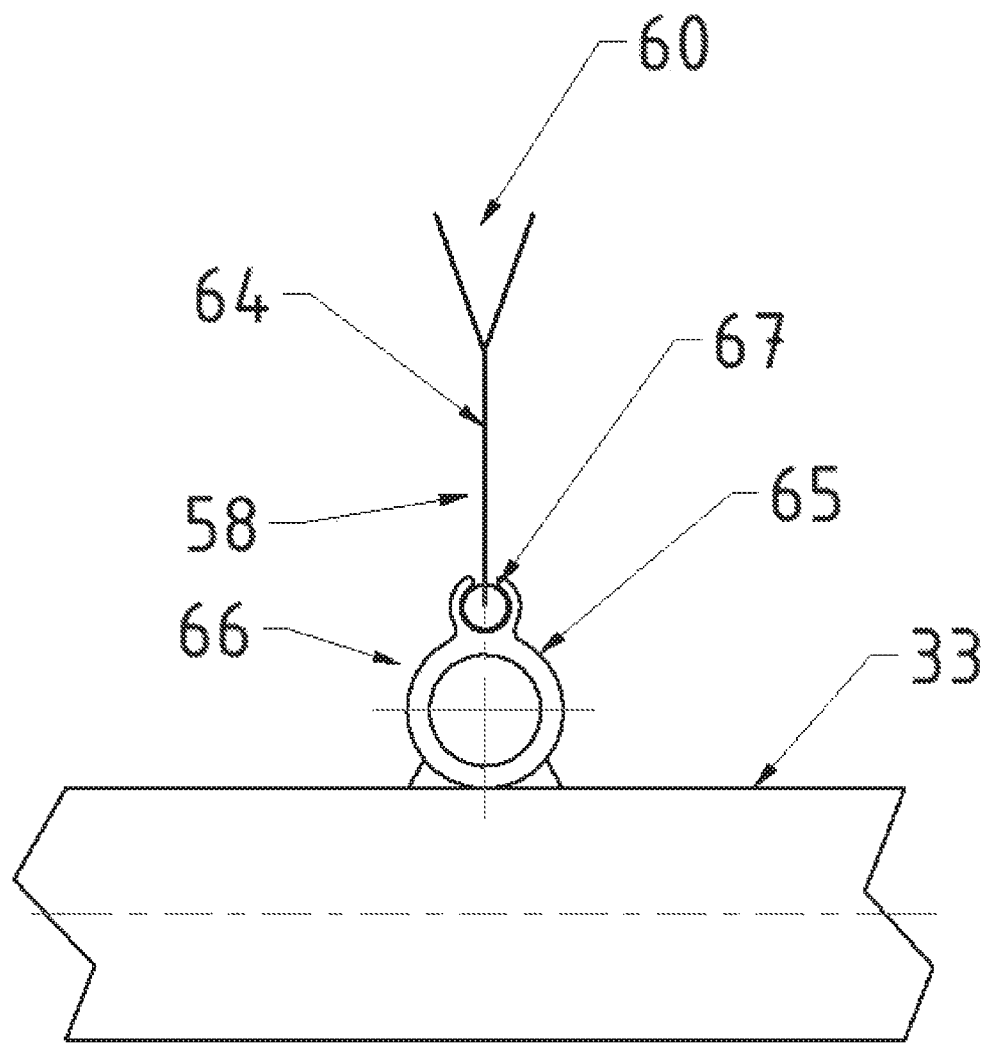
FIG. 14 shows the detail A, which is in FIG. 13A illustrated by means of a circle, in an enlarged scale.

In accordance with FIG. 14, the tensioning film element 58 comprises, on the side of the lower longitudinal member 44, a securing section 64 which is plane or flat in the inflated state of the concentrator cushion 2 and which is secured substantially in the middle at the top side of the lower longitudinal member 33 between the upper longitudinal belts. For this purpose the lower longitudinal member 33 comprises at the top side, substantially in the middle, an upper-side securing element 65 which is connected with the securing section 64 of the tensioning film element 58 by a substantially air-tight connection. In the illustrated embodiment, a keder rail 66 is provided for securing the tensioning film element 58, in which a corresponding keder element 67 is arranged on the lower longitudinal edge of the securing section 64 of the tensioning film element 58. The keder rail 66 for the tensioning film element 58 is designed in correspondence with the afore-described keder rails for the air-tight connection of the bottom film element 3' and/or the sealing film strip 36 to the lower longitudinal member 33.

Figure 16:
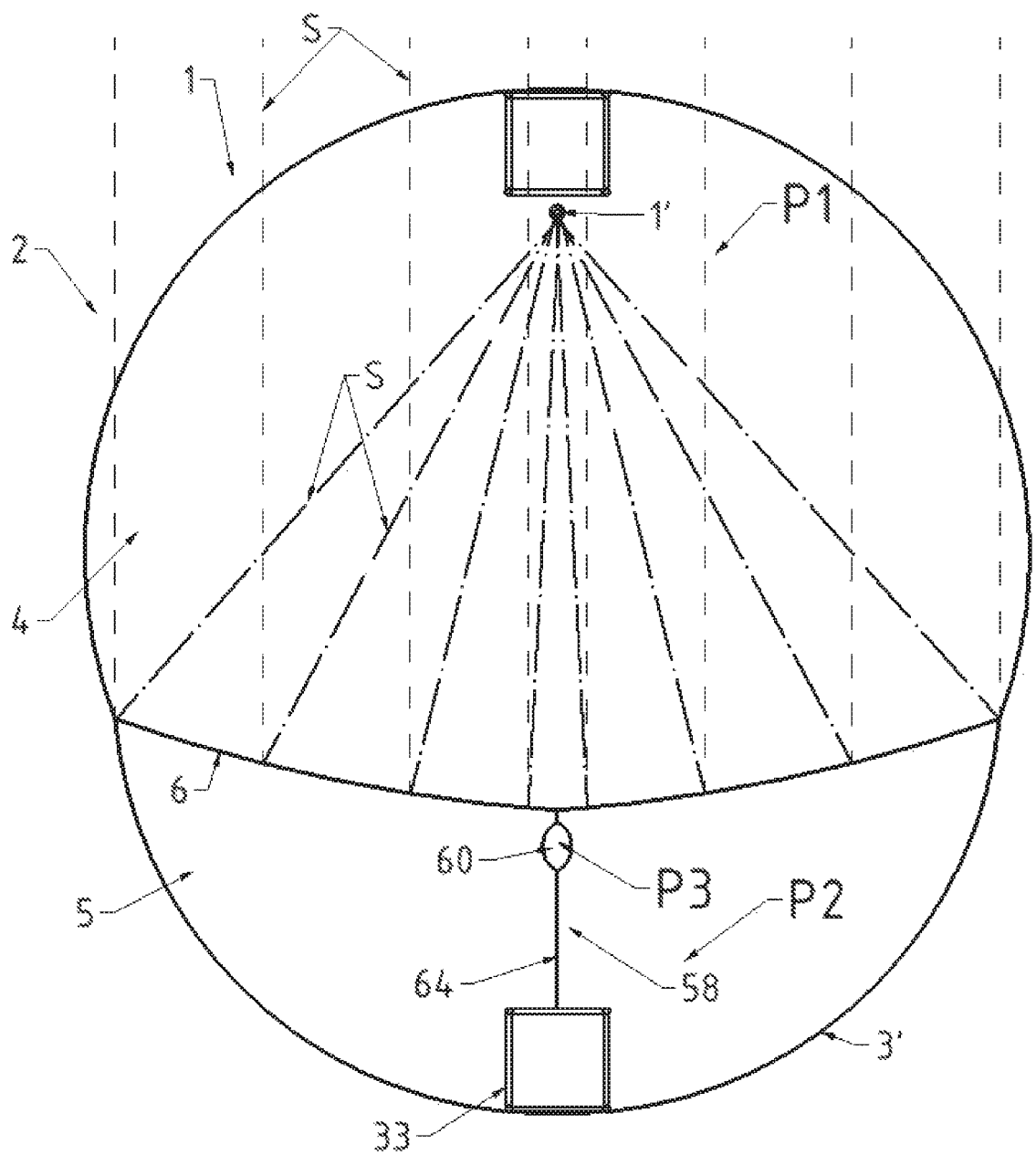
FIG. 16 shows a schematic cross-sectional view of a further embodiment in accordance with the invention of the device with an alternative adjusting device.

In accordance with FIG. 16 the tensioning film element 58 comprises a hollow chamber 60 which is small as compared to the embodiment of FIGS. 13A, and 13B to 15. In this embodiment the securing section 64 of the tensioning film element 58 extends over more than half the height of the tensioning film element 58.

Figure 17:
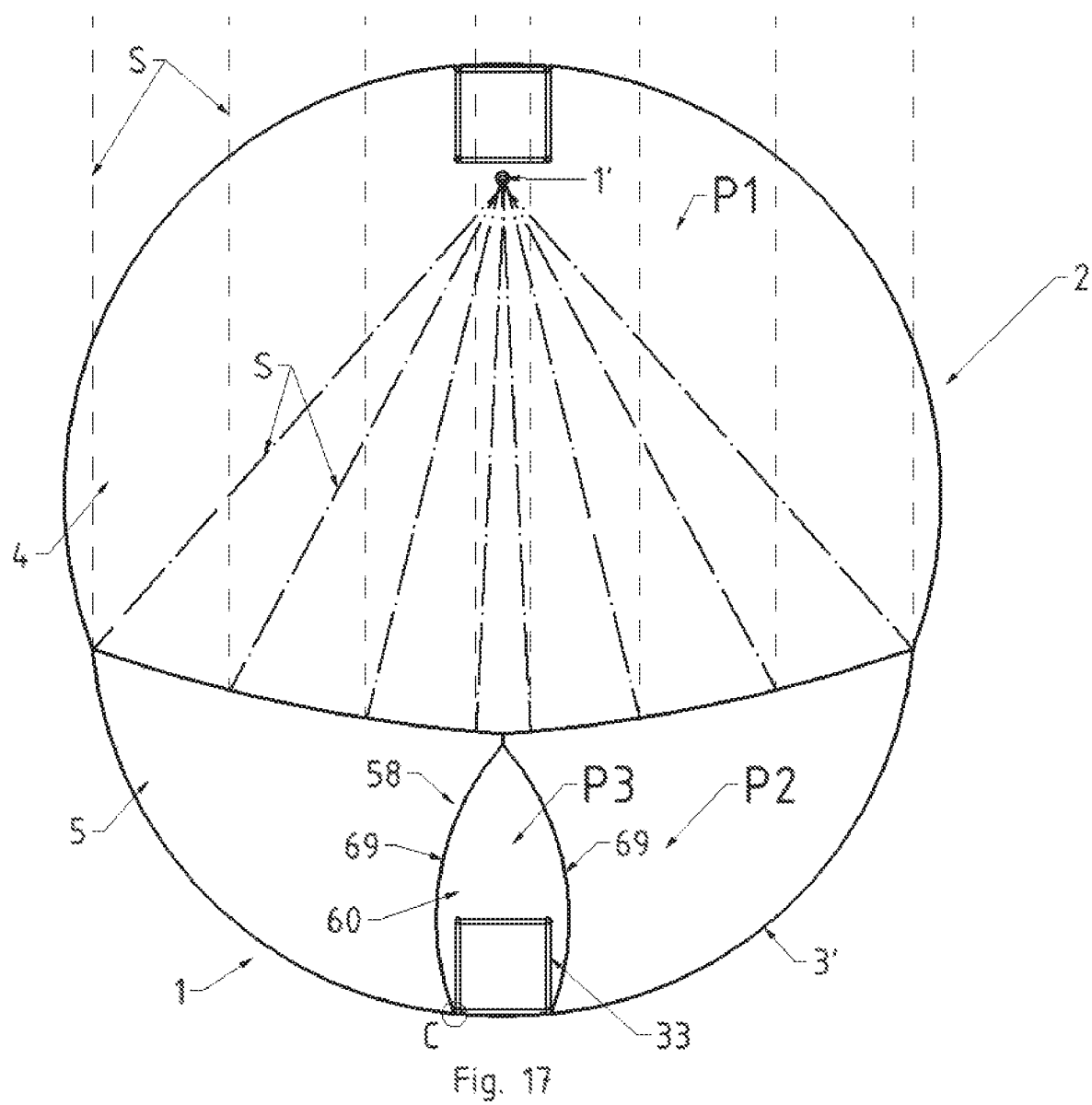
FIG. 17 shows a schematic cross-sectional view of a further embodiment in accordance with the invention of the device with a further alternative adjusting device.
Figure 18:
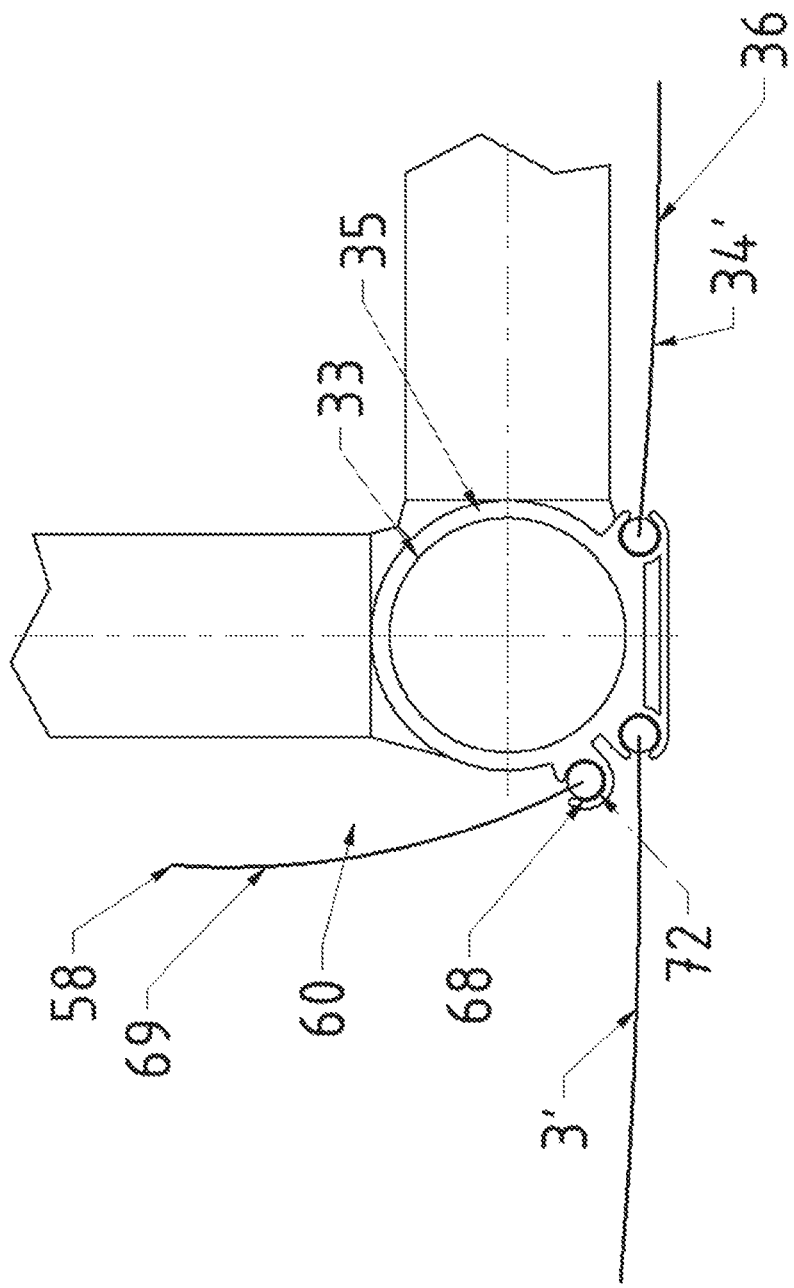
FIG. 18 shows the detail C, which is in FIG. 17 illustrated by means of a circle, in an enlarged scale.

In the embodiment of FIGS. 17, 18 the profile elements 50 at the longitudinal belts 35 of the lower longitudinal member 33 are each connected with a lateral securing element 68 for the substantially air-tight connection with a film strip 69. In this embodiment the hollow chamber 60 of the tensioning film element 58 is confined by the two film strips 69 and the sealing film strip 36. As lateral securing elements 68 further keder rails 71 are provided, in which keder elements 72 are arranged at the lower longitudinal edge of the film strips 69.

The invention claimed is:

1. A device for concentration of solar radiation in an absorber, comprising
an inflatable concentrator cushion which comprises a cover film element comprising a light-permeable entry window for coupling in solar radiation and a reflector film for the concentration of the solar radiation in the absorber, the reflector film sub-dividing the concentrator cushion into at least two hollow spaces and having a curvature in an inflated state of the concentrator cushion,
a pivoting apparatus by means of which the concentrator cushion is pivotable,
a retaining apparatus mounted to the pivoting apparatus for retaining the concentrator cushion, and
an adjusting device for adjusting the curvature of the reflector film of the concentrator cushion,
wherein the retaining apparatus comprises a lower longitudinal member which extends in a longitudinal direction of the concentrator cushion and which is connected to a bottom film element of the concentrator cushion,
wherein the adjusting device for adjusting the curvature of the reflector film comprises a tensioning element between the lower longitudinal member of the retaining apparatus and the reflector film, said tensioning element on one side being connected to the reflector film and on another side being secured to the lower longitudinal member of the retaining apparatus, wherein a normal distance between the lower longitudinal member and the reflector film can be changed by the tensioning element so as to adjust the tensile force transferred from the tensioning element to the reflector film.

2. The device according to claim 1, wherein the tensioning element is connected with a middle longitudinal section of the reflector film which extends substantially in a middle between longitudinal edges of the reflector film in the longitudinal direction of the concentrator cushion.

3. The device according to claim 1, wherein the tensioning element is connected with the reflector film and the lower longitudinal member over substantially an entire length of the reflector film.

4. The device according to claim 2, wherein the tensioning element comprises a tensioning film element which is, in an inflated state of the concentrator cushion, tensioned between the lower longitudinal member and the reflector film.

5. The device according to claim 4, wherein the tensioning film element comprises a tensioning section contacting the middle longitudinal section of the reflector film, wherein the tensioning section is oriented rectangular to the middle longitudinal section of the reflector film.

6. The device according to claim 4, wherein the tensioning film element comprises an inflatable hollow chamber for adjusting a distance between the lower longitudinal member and the reflector film by inflating the hollow chamber of the tensioning film element.

7. The device according to claim 6, wherein the lower longitudinal member is connected in a substantially air-tight manner with longitudinal edges of the bottom film element of the concentrator cushion, which confine a lower passage opening of the concentrator cushion.

8. The device according to claim 7, wherein the lower longitudinal member comprises longitudinal belts, which are connected to one another via filling bars, for a substantially air-tight connection with the longitudinal edges of the bottom film element which confine the lower passage opening, wherein provision is made between the longitudinal belts for a sealing film strip which bridges the lower passage opening of the concentrator cushion.

9. The device according to claim 8, wherein one profile element is in each case arranged on the longitudinal belts of the lower longitudinal member, which profile element is connected to a connecting element for the substantially air-tight connection to one of the longitudinal edges of the bottom film element and to a further connecting element for the substantially air-tight connection to a longitudinal edge of the sealing film strip.

10. The device according to claim 9, wherein the profile elements, at the longitudinal belts of the lower longitudinal member, are in each case connected to a securing element for the substantially air-tight connection with a film strip confining the hollow chamber of the tensioning film element.

11. The device according to claim 4, wherein the lower longitudinal member comprises longitudinal belts and an upper-side securing element for securing the tensioning film element, wherein the upper-side securing element is disposed substantially in the middle between the longitudinal belts.

12. The device according to claim 1, wherein the retaining apparatus comprises an upper longitudinal member which extends in the longitudinal direction of the concentrator cushion, wherein the upper longitudinal member is connected in a substantially air-tight manner with longitudinal edges of the cover film element of the concentrator cushion, which confine an upper passage opening of the concentrator cushion.

13. The device according to claim 1, wherein the pivoting apparatus comprises at least one pivoting element, which surrounds the concentrator cushion in a circumferential direction thereof and to an inner side of which the lower longitudinal member of the retaining apparatus is secured.

14. The device according to claim 1, wherein provision is made for an anchoring apparatus which anchors the pivoting apparatus to a bottom structure.

15. The device according to claim 1, wherein the concentrator cushion is pivotable about its longitudinal axis.

16. The device according to claim 13, wherein the at least one pivoting element is a pivoting ring.

17. The device according to claim 13, wherein the pivoting element is also secured to an upper longitudinal member.

18. The device according to claim 14, wherein the bottom structure comprises a suspension apparatus for suspending the pivoting apparatus.

* * * * *